United States Patent
Kano et al.

(10) Patent No.: US 6,762,903 B2
(45) Date of Patent: Jul. 13, 2004

(54) TAPE DRIVE

(75) Inventors: Yasuaki Kano, Kanagawa (JP);
Toshiya Kurokawa, Kanagawa (JP);
Katsumi Maekawa, Tokyo (JP);
Atsushi Mitani, Tokyo (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 10/059,804

(22) Filed: Jan. 29, 2002

(65) Prior Publication Data

US 2002/0122270 A1 Sep. 5, 2002

(30) Foreign Application Priority Data

Jan. 29, 2001 (JP) .................................... P2001-020646

(51) Int. Cl.[7] .............................................. G11B 5/027
(52) U.S. Cl. .......................................................... 360/85
(58) Field of Search ............................. 360/85, 84, 83, 360/81, 73.01, 71, 95, 70, 73.09, 73.04; 242/334, 334.1, 334.6

(56) References Cited

U.S. PATENT DOCUMENTS

| | | | | |
|---|---|---|---|---|
| 5,363,256 A | * | 11/1994 | Kobayashi | .................... 360/85 |
| 5,808,827 A | * | 9/1998 | Kumano et al. | ............... 360/85 |
| 2003/0132331 A1 | * | 7/2003 | Lee et al. | .................... 242/335 |

* cited by examiner

Primary Examiner—Julie Anne Watko
(74) Attorney, Agent, or Firm—Jay H. Maioli

(57) ABSTRACT

A tape drive uses a single-reel type tape cassette, and includes a pull-back guide shaft for pulling back a tape-shaped recording medium at a predetermined position and a pair of moveable guide pins, whereby the tape-shaped recording medium is positioned between the paired guide pins is wound around the drum. A tension device applies a predetermined tension when the tape-shaped recording medium has been drawn out and a tape path has been formed. A non-winding fast feed mode is set in which the tape-shaped recording medium is fed at high speed under a predetermined tension wherein the tape-shaped recording medium is not wound around the drum. The tension device has a tension regulator lever having two guide shafts for both winding feed mode and non-winding feed mode.

7 Claims, 34 Drawing Sheets

TAPE DRIVE

BACKGROUND OF THE INVENTION

1. Field of the Invention

The present invention relates to a tape drive and, more particularly, to a technical field for a tape drive that employs a single-reel type tape cassette having a tape-shaped recording medium wound around a single cassette reel rotatably supported in a case, and draws out the tape-shaped recording medium from the case by a loading device.

2. Description of the Related Art

There is available a tape drive that uses a single-reel type tape cassette having a tape-shaped recording medium wound around a single cassette reel rotatably supported in a case. In such a tape drive, the tape-shaped recording medium is pulled out of the case by a loading device and taken up by a take-up reel to record or reproduce information signals onto or from the tape-shaped recording medium.

Tape drives are available in a so-called fixed head type and a so-called helical scanning type. In the fixed head type, a tape-shaped recording medium is slidable in contact with a fixed head to perform recording and reproduction. In the helical scanning type, the tape-shaped recording medium is wound around a rotating drum at a predetermined angle to perform recording and reproduction. In a helical scanning type tape drive, the outside diameter has to be increased to increase the winding space for the tape-shaped recording medium around the drum to achieve a larger capacity and to achieve multiple channels to increase transfer rate. Especially in a tape drive primarily designed for the backup of computer data or the like, as in the case of a so-called tape streamer, there is a high demand for a larger capacity and higher transfer rate; hence, a drum with a larger outside diameter is frequently used.

This, however, poses a problem in that the entire tape drive unavoidably becomes larger, although a larger capacity and a higher transfer rate can be achieved by increasing the outside diameter of the drum.

Furthermore, tape drives are also required to improve the feeding stability of a tape-shaped recording media to optimize the recording and reproduction of information signals.

In addition, according to the conventional tape drive described above, the tape-shaped recording medium is always fed while being wrapped around a drum in both an FF mode and the REW mode, and there has been a danger of damage to the tape-shaped recording medium during the feed. On the other hand, to avoid the danger of damage to the tape-shaped recording medium, the feeding speed must be reduced, adversely affecting the efforts for achieving fast feed.

If an attempt is made to feed the tape-shaped recording medium without wrapping it around the drum in order to avoid damage to the tape-shaped recording medium and to secure fast feed, then it would be impossible to form the foregoing predetermined tape path, and a tension detecting device would not operate. In this case, therefore, it would be necessary to set a higher tape tension. Setting a higher tape tension, however, would present a problem of a shortened service life of the tape-shaped recording medium.

Furthermore, in the conventional tape drive described above, different tension detecting devices are used, depending on the feeding mode, namely, a winding feed mode or a non-winding feed mode, so as to apply different predetermined tension to the tape-shaped recording medium. This means more parts are involved, with consequent higher cost, and also an extra space for accommodating the two tension detecting devices, interfering with the efforts for saving installation spaces.

In addition, when the conventional tape drive uses only one tension detecting device, and control is conducted to maintain a constant tension applied to the tape-shaped recording medium in both the fast forward FF mode and the fast reverse (rewind) REW mode, the tension control is carried out after the tape-shaped recording medium is set to be slidable in contact with the drum in the REW mode. This may cause a danger in that the tape-shaped recording medium is brought into contact with a head of the drum under a higher than necessary pressure, causing excessive load to be applied to the tape-shaped recording medium. Hence, there has been a problem in that it is impossible to accomplish highly accurate tension control, resulting in poor feeding stability.

SUMMARY OF THE INVENTION

Accordingly, it is an object of the present invention to provide a tape drive that overcomes the aforesaid shortcomings, has a smaller size, and provides improve feeding stability.

It is another object of the present invention to provide a tape drive that overcomes the aforesaid shortcomings and that permits fast feed without causing damage to a tape-shaped recording medium.

It is yet another object of the present invention to provide a tape drive that overcomes the aforesaid shortcomings and achieves a reduced number of parts and improved stability of feeding a tape-shaped recording medium.

To these ends, according to one aspect of the present invention, there is provided a tape drive having a drum around which a tape-shaped recording medium drawn out of a case is wound in slidable contact, a pull-back guide shaft for pulling back the tape-shaped recording medium, which has been drawn out by a loading device, at a predetermined position in the vicinity of an outlet of the case, and a pair of guide pins that can be moved toward or away from the drum and is positioned so that the guide pins are spaced away from each other in the circumferential direction of the drum in the vicinity of the drum when they are moved toward the drum, wherein the tape-shaped recording medium, which has been drawn out of the case by the loading device, is pulled back in sequence by the pull-back guide shaft and the pair of guide pins moved toward the drum so that the tape-shaped recording medium positioned between the paired guide pins is wound around the drum.

This arrangement obviates the need for a device for forming a tape path on an end opposite from the end where the tape-shaped recording medium is wound around the drum, and also ensures that the tape-shaped recording medium, which has been pulled out of the outlet, will be always fed along a predetermined path.

According to another aspect of the present invention, there is provided a tape drive having a drum around which the tape-shaped recording medium drawn out of a case is wound in slidable contact, and a tension detecting device for applying a predetermined tension to the tape-shaped recording medium under a condition wherein the tape-shaped recording medium has been drawn out and a tape path has been formed, the tape drive having a non-winding fast feed mode in which the tape-shaped recording medium is fed at high speed under a predetermined tension applied by the tension detecting device in a state wherein the tape-shaped recording medium is not wound around the drum.

With this arrangement, the tape-shaped recording medium is fed at high speed under a predetermined tension without being wrapped around the drum.

According to still another aspect of the present invention, there is provided a tape drive having a tension regulator lever that is rotatably supported by a chassis and circularly moved in a first direction in a winding feed mode, and moved in a second direction, which is opposite from the first direction, in the non-winding feed mode, a first guide shaft provided on the tension regulator lever to apply a tension by coming in contact with the tape-shaped recording medium when the tension regulator lever is circularly moved in the first direction in the winding feed mode, and a second guide shaft provided on the tension regulator lever to apply a tension by coming in contact with the tape-shaped recording medium when the tension regulator lever is circularly moved in the second direction in the non-winding feed mode.

With this arrangement, the tension is controlled differently according to the direction in which the tension regulator lever is circularly moved, i.e., according to the feeding mode, namely, the winding feed mode or the non-winding feed mode.

According to a further aspect of the present invention, there is provided a tape drive having a first tension detecting device provided between the drum and one reel to apply a predetermined tension to the tape-shaped recording medium in a fast forward feed mode in which a tape path is formed and the tape-shaped recording medium is fed forward at high speed, and a second tension detecting device provided between the drum and the other reel to apply a predetermined tension to the tape-shaped recording medium in a fast reverse feed mode in which a tape path is formed and the tape-shaped recording medium is fed backward at high speed.

With this arrangement, regardless of whether the feeding mode is the fast forward feed mode or the fast reverse feed mode, the tension applied to the tape-shaped recording medium is controlled before reaching the drum in the direction in which the tape-shaped recording medium is fed.

DESCRIPTION OF THE PREFERRED EMBODIMENTS

An embodiment in accordance with the present invention will be described with reference to the accompanying drawings.

The following embodiment is an example wherein the present invention has been applied to a tape drive used as a tape streamer mainly intended for data backup or the like.

Figure 1:
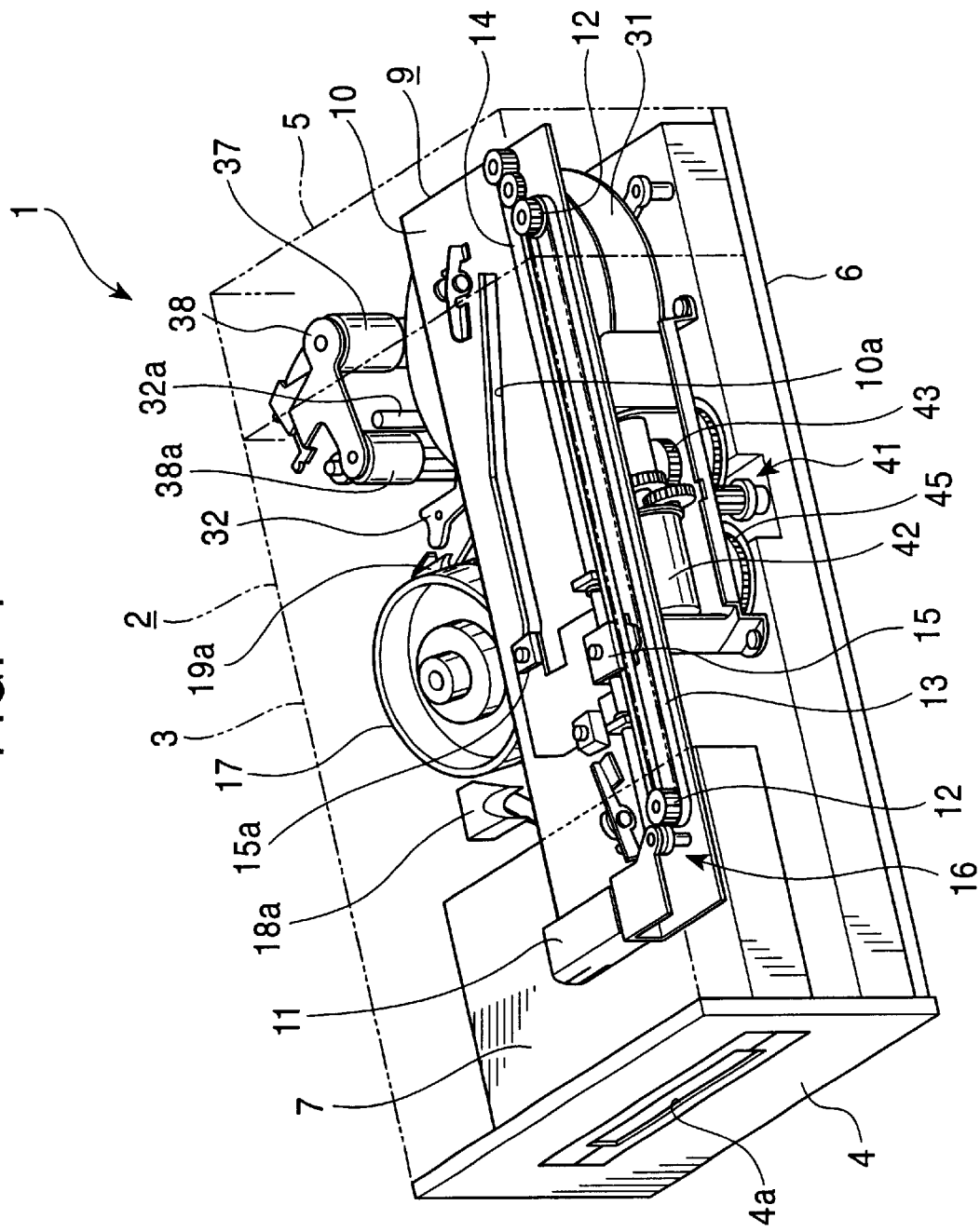
FIG. 1, as well as FIG. 2 through FIG. 36, illustrate an embodiment in accordance with the present invention, FIG. 1 being a schematic perspective view of a tape drive.

In a tape drive 1 shown in FIG. 1, different modes are set for feeding a tape-shaped recording medium. The modes set in the tape drive 1 include a winding feed mode in which the tape-shaped recording medium is fed while being wound around a drum, and an non-winding feed mode in which the tape-shaped recording medium is fed without being wound around the drum.

The winding feed mode includes a forward feed mode (FWD mode) in which the tape-shaped recording medium is fed from a tape cassette to the tape drive 1 to record or reproduce information signals, a reverse feed mode (REV mode) in which the tape-shaped recording medium is fed from the tape drive 1 to the tape cassette to record or reproduce information signals, a fast forward feed mode (FF mode) in which the tape-shaped recording medium is fed from the tape cassette to the tape drive 1 at high speed, and a fast reverse feed mode (REW mode) in which the tape-shaped recording medium is fed from the tape drive 1 to the tape cassette at high speed.

The non-winding feed mode includes a fast forward feed mode (UW-FF mode) in which the tape-shaped recording medium is fed from the tape cassette to the tape drive 1 at high speed and a fast reverse feed mode (UW-REW mode) in which the tape-shaped recording medium is fed from the tape drive 1 to the tape cassette at high speed.

First, referring mainly to FIG. 1 through FIG. 8, the construction of the tape drive will be explained. FIG. 1 through FIG. 4 illustrate a state wherein the tape cassette has been loaded onto the tape drive 1.

The tape drive 1 is formed of necessary members and devices disposed in a cabinet 2. The cabinet 2 shaped like a rectangular box with an open bottom has a cover 3, a front panel 4 attached to the front end of the cover 3, and a rear panel 5 attached to the rear end of the cover 3. A chassis 6 on which the members and devices are mounted is covered by the cabinet 2 (see FIG. 1 and FIG. 2).

A horizontally long cassette loading/unloading slot 4a is formed in the front panel 4. A tape cassette 100 is inserted or removed through the cassette loading/unloading slot 4a.

Figure 3:
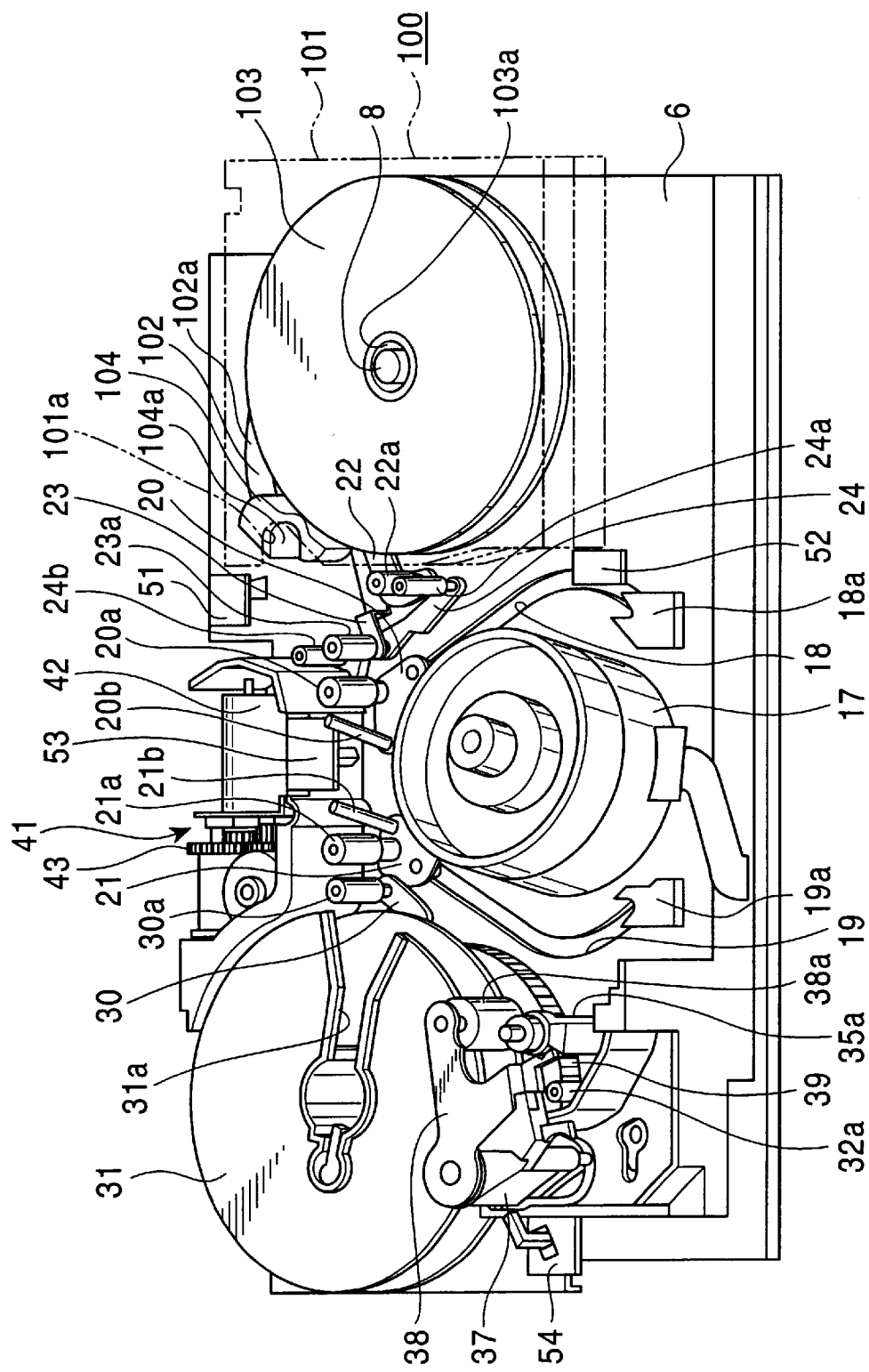
FIG. 3 is a schematic perspective view showing a state wherein a tape cassette has been retained in a cassette holder.

A cassette holder 7 is provided at the front end of the chassis 6, and the tape cassette 100, which has been inserted through the loading/unloading slot 4a, is held by the cassette holder 7 (see FIG. 3). The tape cassette 100 has a tape reel 103, around which a tape-shaped recording medium 102 has been wound, the cassette reel 103 being rotatably supported in a case 101 formed of a pair of upper and lower halves. A leader block 104 is attached to the leading end of the tape-shaped recording medium 102 (see FIG. 3 and FIG. 4). The leader block 104 has a fitting hole 104a extending vertically. The leader block 104 is positioned immediately inside an outlet 101a formed in the case 101 before the tape-shaped recording medium 102 is pulled out of the case 101 (see FIG. 3 and FIG. 4).

Figure 4:
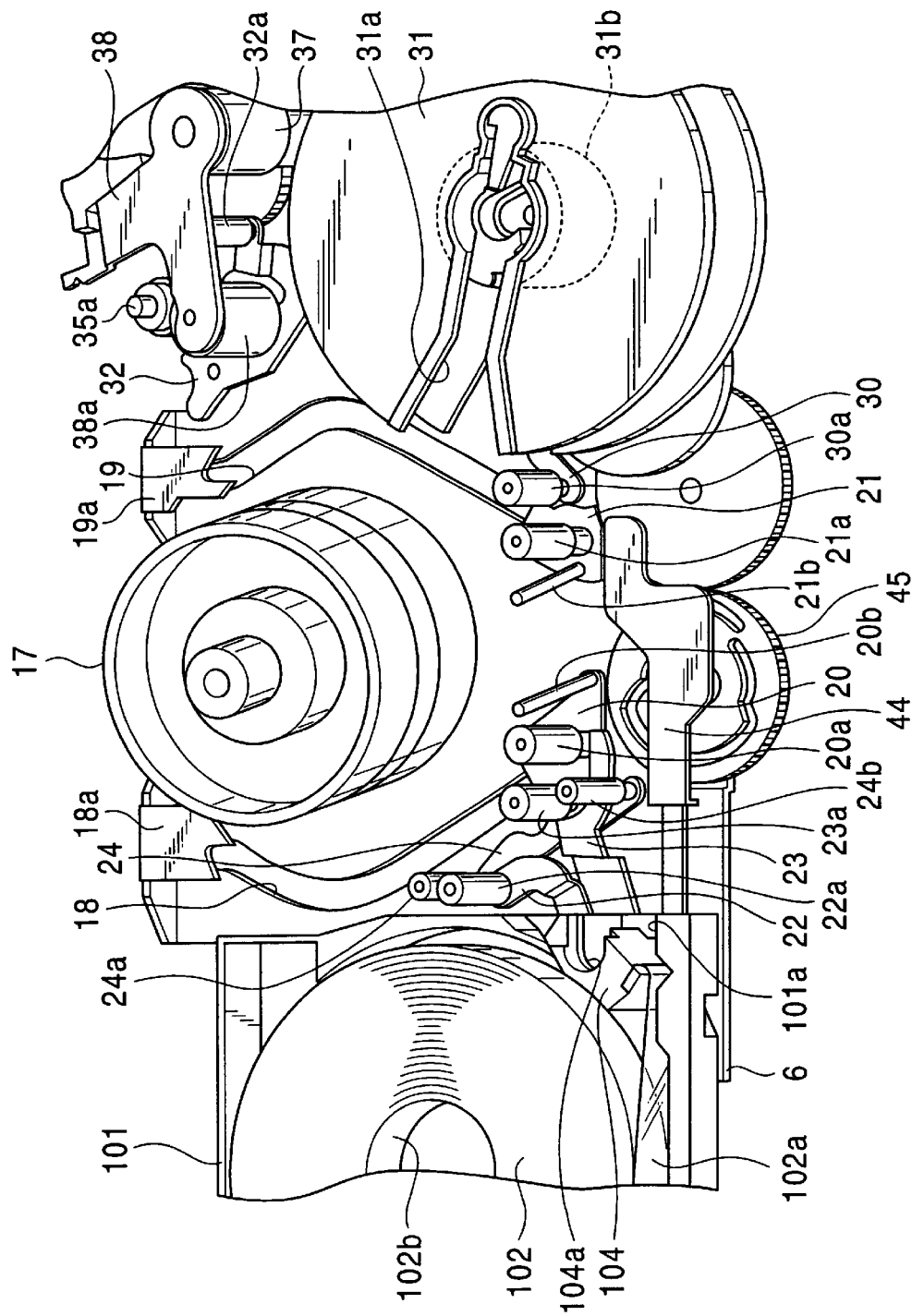
FIG. 4 is a schematic enlarged perspective view of an essential section showing the state wherein the tape cassette has been retained in the cassette holder.

A transparent leader tape portion 102a is provided at the leading end of the tape-shaped recording medium 102, and a leader tape portion 102b is provided at the opposite end of the tape-shaped recording medium 102 (see FIG. 4).

When the tape cassette 100 is retained in the cassette holder 7, an engaging shaft 8 rotatably supported by the chassis 6 is fitted into an engaging hole 103a formed at the center of the tape reel 103 (see FIG. 3).

In the cabinet 2, a transporter block 9 is disposed at a position away upward from the chassis 6 (see FIG. 1).

The transporter block 9 has necessary devices mounted on a rectangular base plate 10. A guide slot 10a that extends approximately in the longitudinal direction is formed in the base plate 10.

A conveying motor 11 is disposed at the front end of the base plate 10. In the vicinity of one side edge of the base plate 10, a pair of pulley gears 12 and 12 is supported in such a manner that the pulley gears are longitudinally spaced away from each other, and a belt 13 is installed on the pulley gears 12 and 12. The base plate 10 is further provided with a guide shaft 14 installed along the belt 13, and a conveying member 15 is slidably supported by the guide shaft 14.

The conveying member 15 is attached to a part of the belt 13, and a movable base 15a that moves by being guided by the guide slot 10a is provided at the distal end of the conveying member 15. The driving force of the conveying motor 11 is transmitted to the pulley gears 12 through the intermediary of a power transmitting device 16 disposed on the base plate 10 so as to run the belt 13. As the belt 13 runs, the conveying member 15 is moved forward or backward by being guided by the guide shaft 14, and the movable base 15a is also moved by being guided by the guide slot 10a.

The chassis 6 further includes a drum 17 and guide slots 18 and 19 formed in the chassis 6 such that they are longitudinally spaced away from each other, sandwiching the drum 17 (refer to FIG. 3 and FIG. 4). The drum 17 is run by a drum motor 17a disposed on the bottom surface of the chassis 6 (refer to FIG. 7).

The guide slots 18 and 19 movably support a first coaster 20 and a second coaster 21, respectively. Provided on the first coaster 20 are a guide roller 20a rotatably supported and a tilting guide 20b. Provided on the second coaster 21 are a guide roller 21a rotatably supported and a tilting guide 21b. Stoppers 18a and 19a are provided at the ends of the guide slots 18 and 19, respectively, the ends being the ones adjacent to the drum 17.

Figure 5:
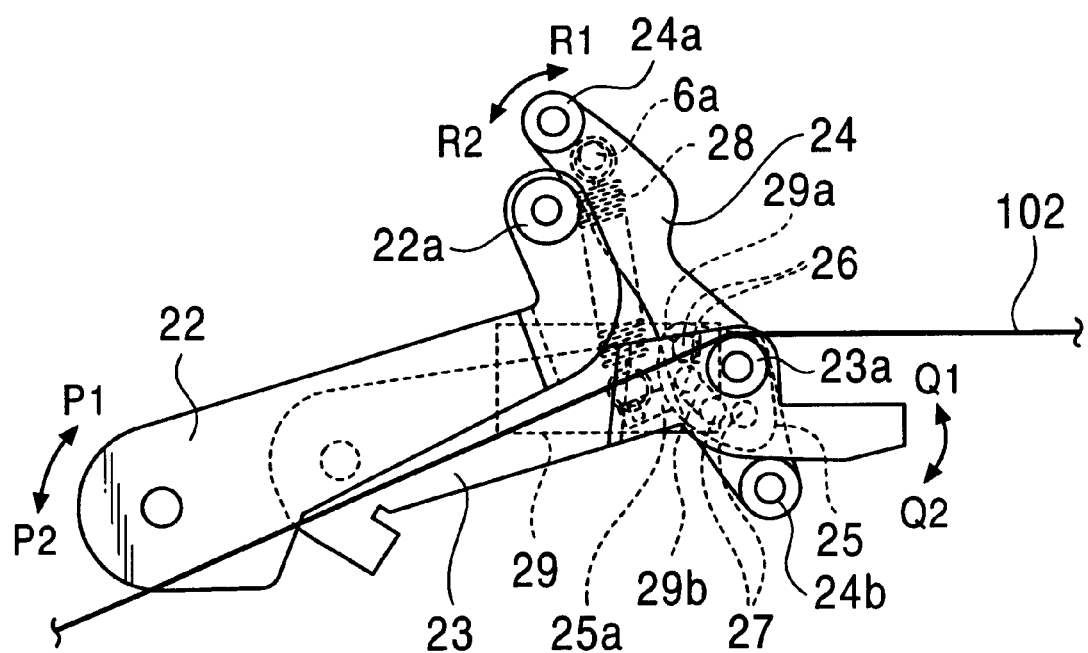
FIG. 5 is an enlarged top plan view showing a positional relationship among a pull-back guide arm, a tape guide arm, and a tension regulator lever immediately after a tape-shaped recording medium is drawn out of the tape cassette and a leader block is attached to a take-up reel.

At the other end of the guide slot 18 that is positioned at the front side of the drum 17, that is, in the vicinity of the opposite end from the position where the drum 17 is located, a pull-back guide arm 22, a first tape guide arm 23, and a tension regulator lever 24 are rotatably supported by the chassis 6 (refer to FIG. 3 through FIG. 5).

The pull-back guide arm 22 has a pivot at one end thereof, and also has a pull-back guide roller 22a rotatably supported at the other end thereof. The first tape guide arm 23 is provided with a pivot at one end thereof and also a tape guide roller 23a rotatably supported at a position near the other end thereof. The tension regulator lever 24 has a pivot at the middle thereof, a first guide roller 24a rotatably supported at one end thereof, and a second guide roller 24b rotatably supported at the other end thereof.

The pull-back guide arm 22, the first tape guide arm 23, and the tension regulator lever 24 are arranged such that the pull-back guide arm 22 is positioned above the first tape guide arm 23, and the first tape guide arm 23 is positioned above the tension regulator lever 24.

Figure 6:
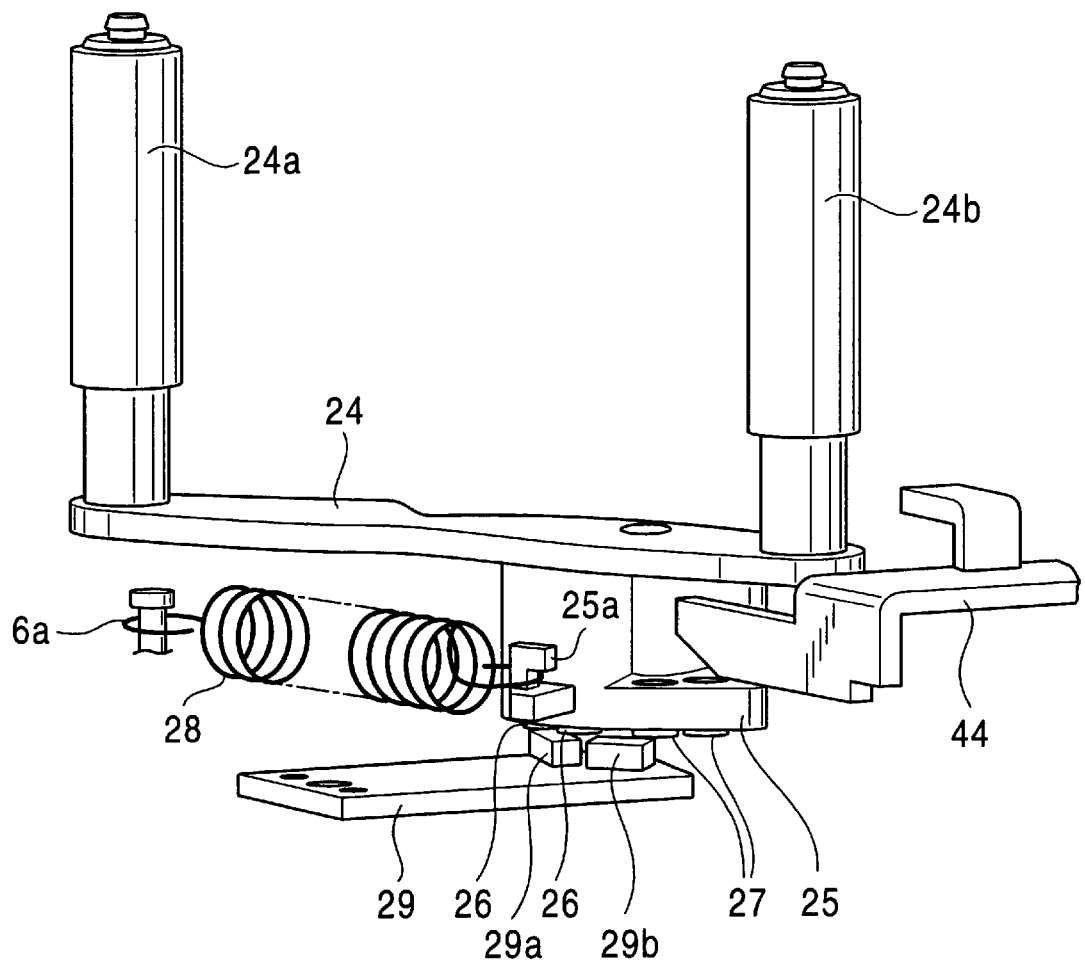
FIG. 6 is an enlarged perspective view showing the constructions of the tension regulator lever and the parts positioned around the tension regulator lever.

The tension regulator lever 24 is provided with a magnet mounting portion 25 that projects downward from the pivot of the tension regular lever 24. Two pairs of magnets 26, 26 and 27, 27 are disposed on the magnet mounting portion 25 such that they are spaced away from each other in the direction in which the tension regulator lever 24 circularly moves, as shown in FIGS. 5 and 6. One end of each of the magnets 26, 26 and the magnets 27, 27 is magnetized to the south pole, while the other end thereof is magnetized to the north pole.

The magnet mounting portion 25 has a spring hook 25a. A tensile coil spring 28 is provided between the spring hook 25a and a spring hook 6a provided on the chassis 6.

The chassis 6 further includes a first tension detecting board 29 provided under the tension regulator lever 24. Sensors 29a and 29b are mounted on the first tension detecting board 29 such that they are spaced away from each other in the direction in which the tension regulator lever 24 circularly moves (refer to FIG. 5 through FIG. 7).

At the rear end of the chassis 6, a second tape guide arm 30 is rotatably supported. The second tape guide arm 30 has a pivot on one end thereof and a tape guide roller 30a rotatably supported at the other end thereof, as shown in FIGS. 3 and 4.

Figure 2:
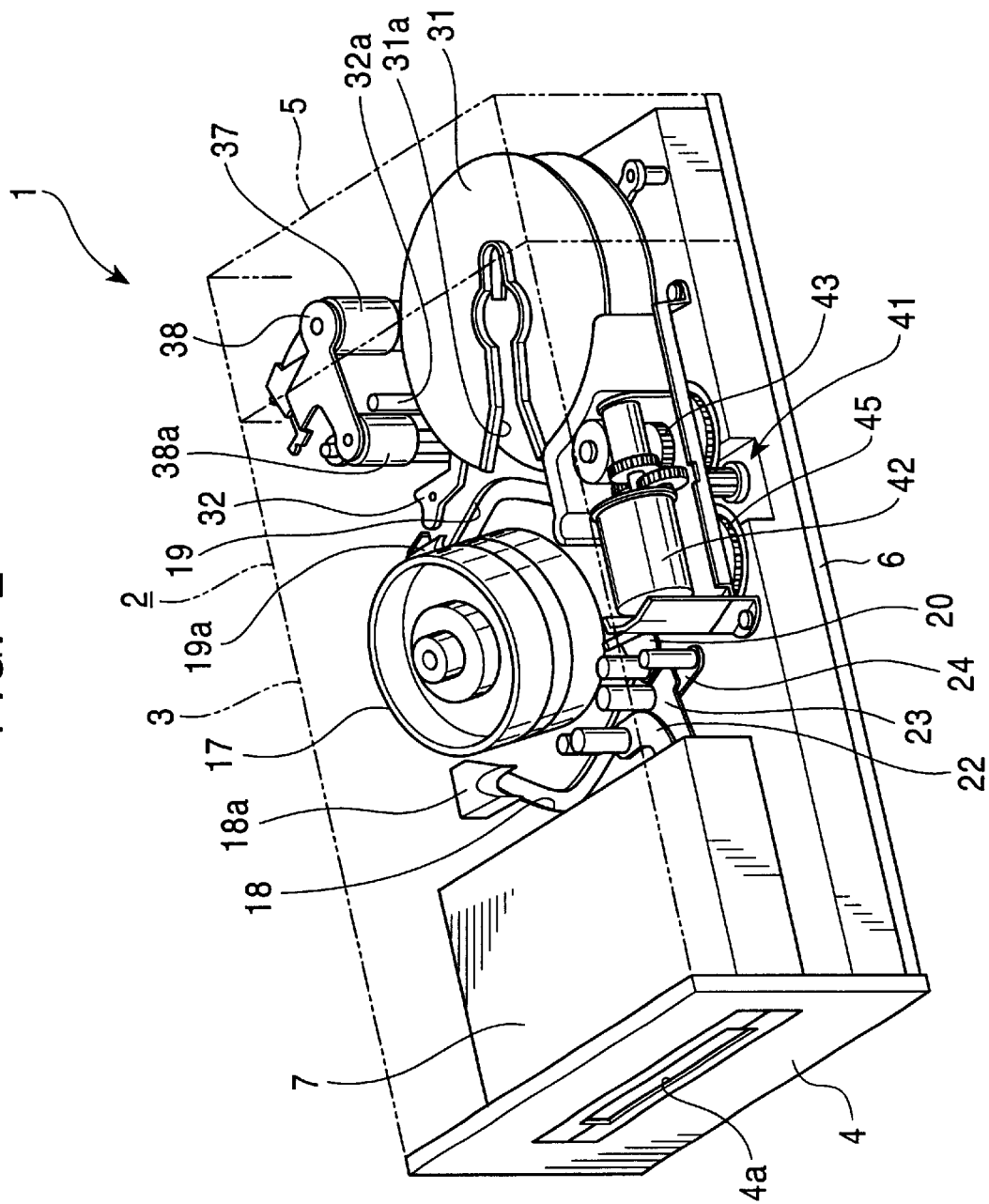
FIG. 2 is a schematic perspective view of the tape drive with its transporter block removed.

On the chassis 6, a take-up reel 31 is rotatably supported at a position where it partly covers the second tape guide arm 30, as shown in FIG. 2 through FIG. 4. The take-up reel 31 has an insertion slit 31a that extends from the center to the rim of the take-up reel 31. The leader block 104 of the tape cassette 100 is inserted through the insertion slit 31a and mounted at the center of the take-up reel 31. The center of the take-up reel 31 is provided with a take-up hub 31b, as shown in FIG. 4. The length of the leader tape portion 102a provided at the distal end of the tape-shaped recording medium 102 is set to be substantially equal to the outside diameter of the take-up hub 31b of the take-up reel 31.

On the chassis 6, a tension regulator arm 32 is rotatably supported behind the drum 17. The tension regulator arm 32 has a pivot on one end thereof, and a guide roller 32a rotatably supported on the other end thereof, as shown in FIGS. 1, 2, and 3, and FIG. 20. The tension regulator arm 32 is provided with a spring hook 32b. A tensile coil spring 33 is installed between the spring hook 32b and a spring hook 6b provided on the chassis 6 (refer to FIG. 20).

The tension regulator arm 32 is provided with a magnet mounting portion (not shown), and a pair of magnets magnetized to the south pole and the north pole is mounted on the magnet mounting portion, as in the case of the tension regulator lever 24.

The chassis 6 is provided with a second tension detecting board 34 (shown in FIG. 7) located below the tension regulator arm 32. The second tension detecting board 34 has sensors (not shown) mounted thereon.

Figure 7:
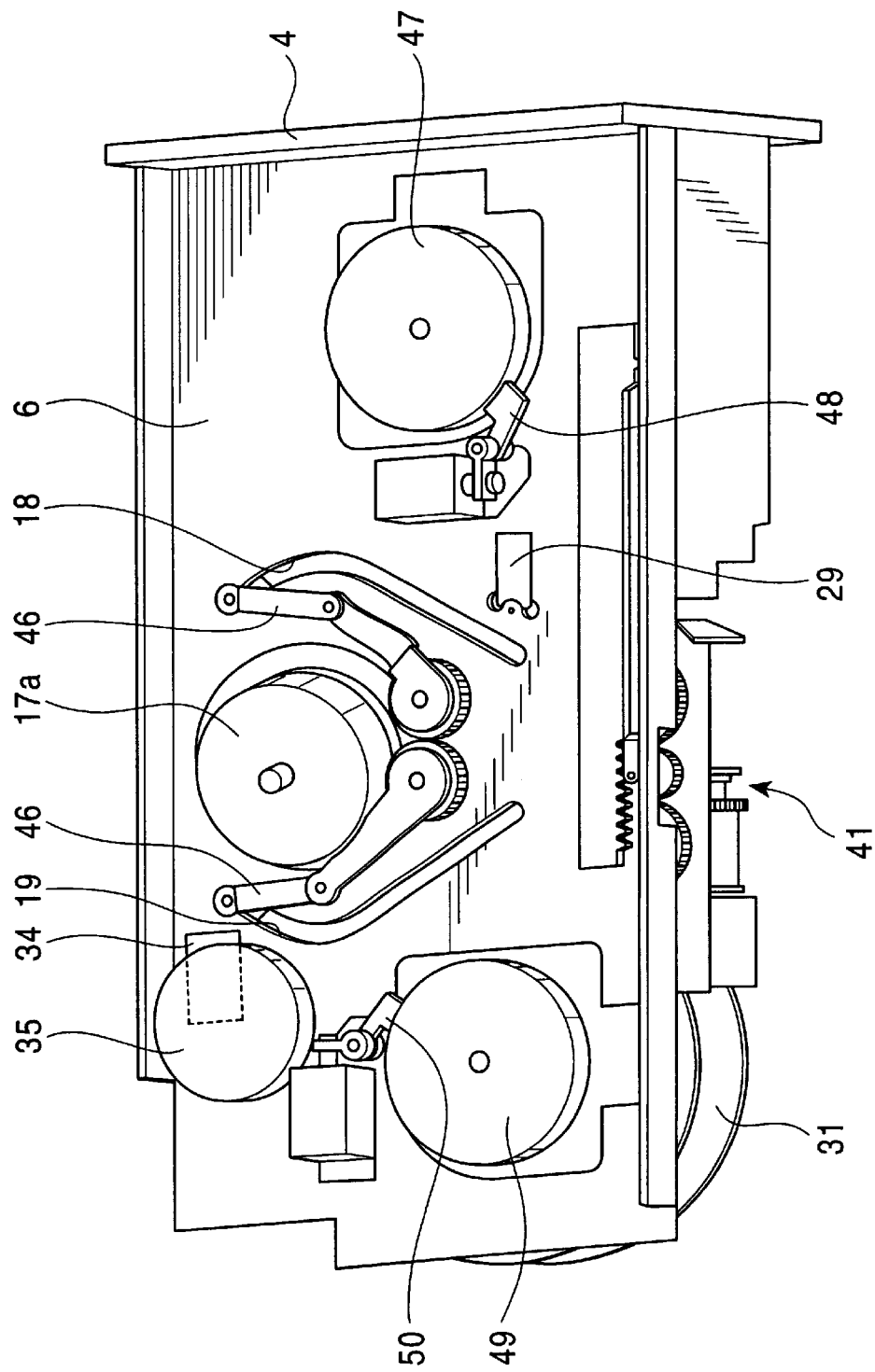
FIG. 7 is a perspective view showing the constructions of the parts disposed on the bottom surface of a chassis.

A capstan motor 35 is disposed on the bottom surface of the chassis 6 in the vicinity of the tension regulator arm 32 (refer to FIG. 7). The capstan motor 35 rotates a capstan shaft 35a that projects upward from the chassis 6.

Figure 8:
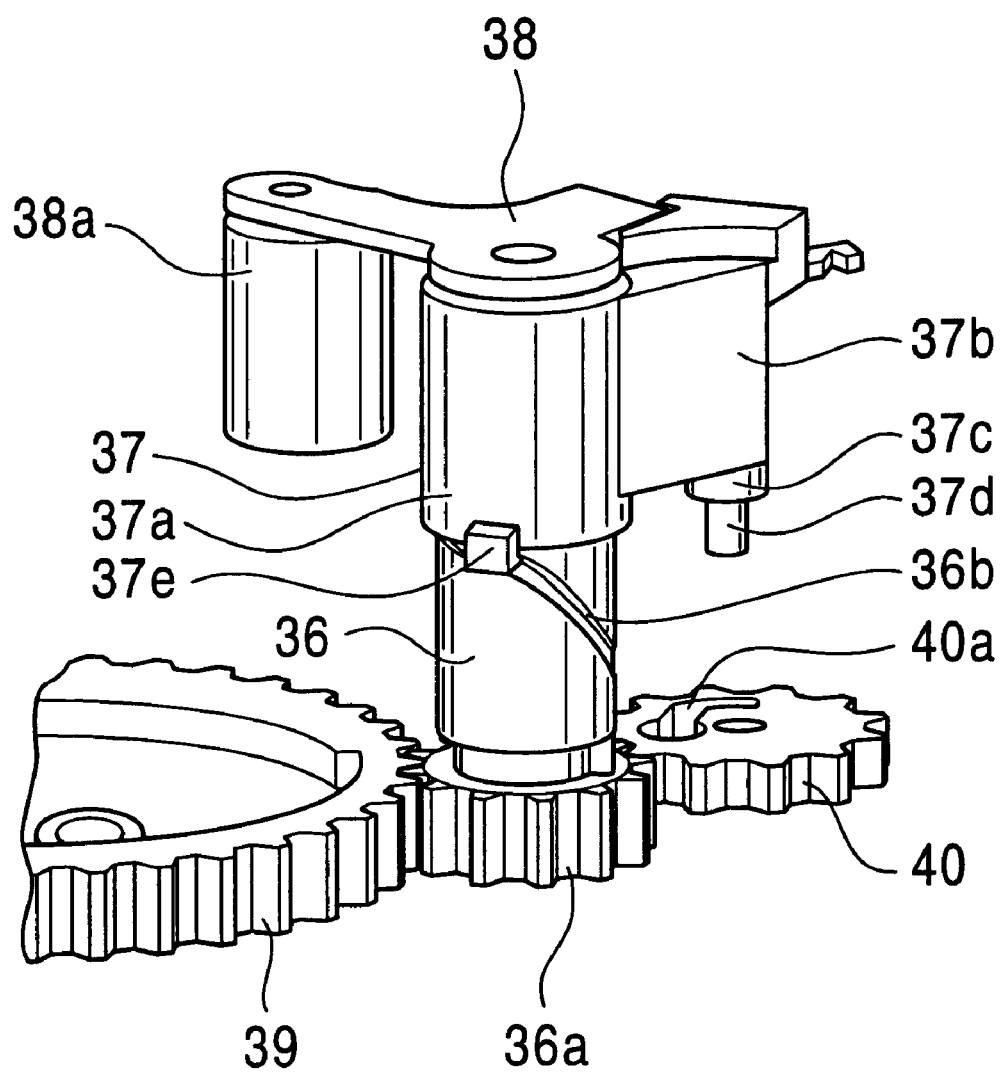
FIG. 8 is an enlarged perspective view illustrating how a pinch roller is actuated.

In the vicinity of the capstan motor 35, a rotating shaft 36 is rotatably supported by the chassis 6, and a gear 36a is installed at the bottom end of the rotating shaft 36, as shown in FIG. 8. A cam groove 36b having a slope portion is formed in the rotating shaft 36.

A pinch arm 37 has a cylindrical shaft 37a and an arm 37b projecting sideways from the cylindrical shaft 37a, a shaft portion 37c provided at the distal end of the arm 37b, and an insertion pin 37d projecting downwards from the shaft portion 37c. The cylindrical shaft 37a is externally fitted to the rotating shaft 36, the rotating shaft 36 being rotatable with respect to the pinch arm 37, as shown in FIG. 8. An engaging protuberance 37e is provided at the bottom end of the cylindrical shaft 37a, the engaging protuberance 37e being slidably engaged with the cam groove 36b of the rotating shaft 36.

A pinch sub arm 38 is provided on the top surface of the pinch arm 37. A pinch roller 38a projecting downward is rotatably supported at the distal end of the pinch sub arm 38, as shown in FIG. 8.

The gear 36a of the rotating shaft 36 is meshed with an annular gear 39 and a pinch press gear 40 supported by the chassis 6, as shown in FIG. 8. The pinch press gear 40 has a cam opening 40a in which the insertion pin 37d of the pinch arm 37 is inserted.

A driving device 41 is provided at the opposite side edge of the chassis 6 from the side where the drum 17 is provided (see FIGS. 1 and 2). The driving device 41 has a driving motor 42, a group of gears 43, a slide lever 44, a cam gear 45, a connecting arms 46 and 46, etc., as shown in FIGS. 3, 4, and 7. The driving force of the driving motor 42 is transmitted to the group of gears 43, the slide lever 44, the cam gear 45, etc. to actuate these parts so as to operate the first coaster 20, the second coaster 21, the pull-back guide arm 22, the first tape guide arm 23, the tension regulator lever 24, the second tape guide arm 30, the tension regulator arm 32, the rotating shaft 36, etc. in each mode.

A tape reel motor 47 is disposed on the bottom surface of the chassis 6, as shown in FIG. 7. The engaging shaft 8 engaged with the engaging hole 103a of the tape reel 103 is secured to the motor shaft of the tape reel motor 47. The tape reel 103 of the tape cassette 100 retained by the cassette holder 7 is rotated according to the rotational direction of the tape reel motor 47.

A tape reel brake 48 is provided on the bottom surface of the chassis 6, as shown in FIG. 7. The rotation of the tape reel motor 47 is stopped when the tape reel brake 48 is operated.

A take-up reel motor 49 is also disposed on the bottom surface of the chassis 6, as shown in FIG. 7. The take-up reel 31 is connected to the motor shaft of the take-up reel motor 49, and the take-up reel 31 is rotated according to the rotational direction of the take-up reel motor 49.

A take-up reel brake 50 is also provided on the bottom surface of the chassis 6, as shown in FIG. 7. The rotation of the take-up reel motor 49 is stopped when the take-up reel brake 50 is operated.

The chassis 6 further includes a first light emitting member 51 located in front of the driving motor 42. Furthermore, a first light-receiving sensor 52 for receiving and detecting the detection light emitted from the first light emitting member 51 is provided in the vicinity of a stopper 18a located at one end of the guide slot 18 formed in the chassis 6, as shown in FIG. 3. Hence, the detection light emitted from the first light emitting member 51 is transmitted along the rear surface of the cassette holder 7 and received by the first light receiving sensor 52.

The chassis 6 further includes a second light emitting member 53 disposed right next to the driving motor 42. A second light receiving sensor 54 for receiving and detecting the detection light emitted from the second light emitting member 53 is provided at the rear end of the chassis 6, as shown in FIG. 3. Hence, the detection light emitted from the second light emitting member 53 passes through the take-up reel 31 and reaches the second light receiving sensor 54.

Referring now mainly to FIG. 9 through FIG. 36, the operation of the tape drive 1 will be described. In the description of the operation of the tape drive 1, the side where the driving motor 42 of the driving device 41 is disposed will be referred to as "the right side", while the side where the drum 17 is disposed will be referred to as "the left side."

First, the description will be given of the operation in which the leader block 104 is loaded onto the take-up reel 31 from a state wherein the tape cassette 100 has been retained in the cassette holder 7.

When the tape cassette 100 is inserted into the cassette holder 7 through the cassette insertion slot 4a, the tape cassette 100 is locked by a locking device (not shown) so as to be retained by the cassette holder 7. At this time, the engaging shaft 8 rotatably supported by the chassis 6 engages with the engaging hole 103a formed at the center of the tape reel 103, as shown in FIG. 3.

When the engaging shaft 8 engages the engaging hole 103a, a fitting shaft (not shown) is fitted in a fitting hole 104a of the leader block 104, thus allowing the leader block 104 to be moved by the moving base 15a of the transporter block 9.

Figure 9:
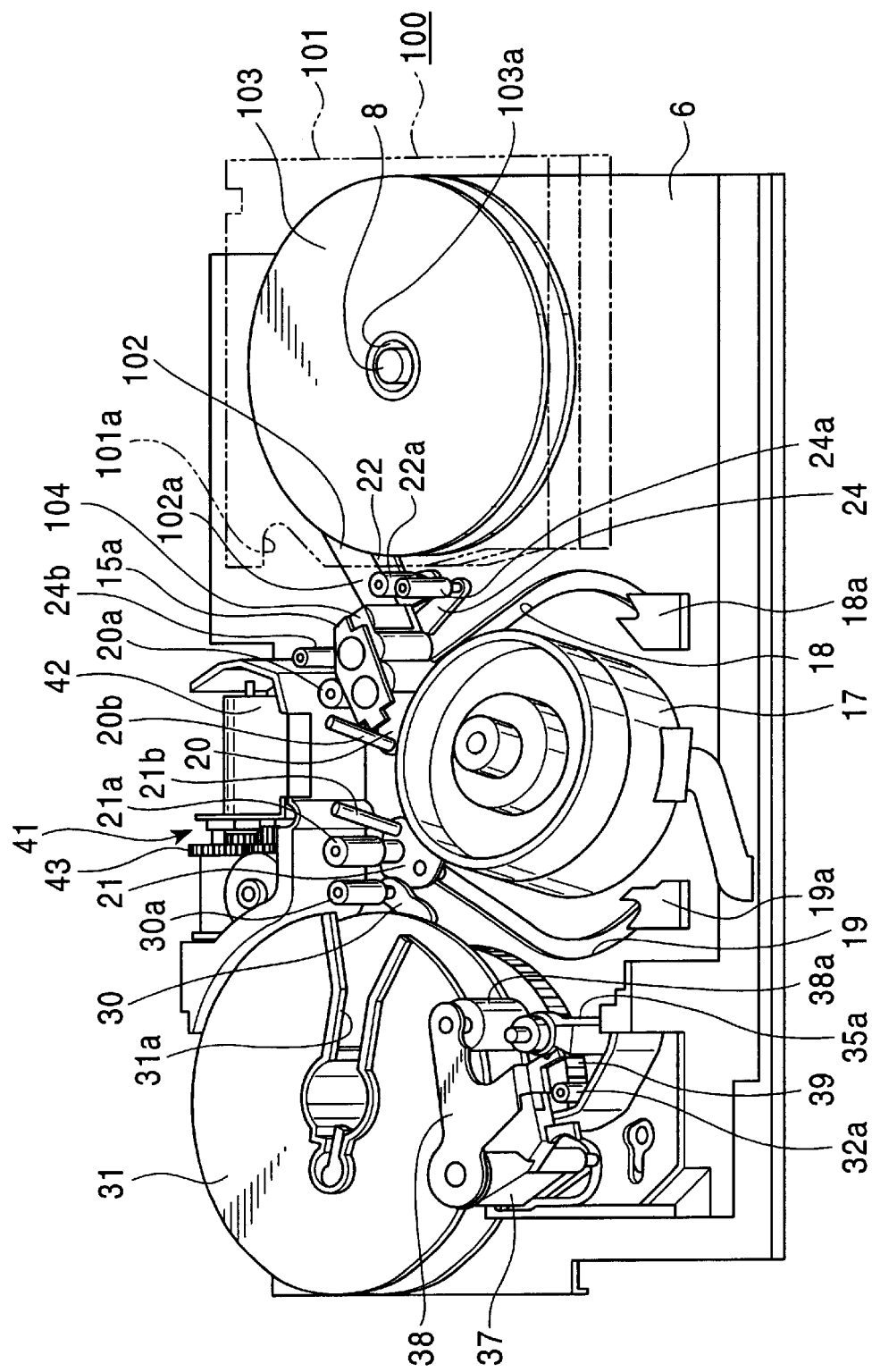
FIG. 9 is a schematic perspective view illustrating a state wherein the tape-shaped recording medium is being drawn out of a tape cassette case.

As the conveying motor 11 is driven, the belt 13 is fed through the intermediary of the power transmitting device 16, causing the conveying member 15 to move backward by being guided by the guide shaft 14 and the moving base 15a to move by being guided by the guide slot 10a. This causes the tape-shaped recording medium 102 to be drawn out of the case 101, as illustrated in FIG. 9.

When the tape-shaped recording medium 102 is drawn out, the pull-back guide arm 22, the first tape guide arm 23, and the tension regulator lever 24 are positioned such that the pull-back guide roller 22a and the first guide roller 24a are close to each other, while the tape guide roller 23a and the second guide roller 24b are close to each other, being spaced away to the right from the former (refer to FIGS. 4 and 5). The first coaster 20 and the second coaster 21 are both positioned at the rightmost stroke end farthest from the drum 7, and the second tape guide arm 30 is positioned at the rightmost stroke end in the direction of its circular movement so that the tape guide roller 30a is positioned near the second coaster 21 (refer to FIGS. 4 and 9).

The leader block 104 passes the pull-back guide roller 22a, the first guide roller 24a, the tape guide roller 23a, and the second guide roller 24b, then further passes on the left side of the guide roller 20a, the tilting guide 20b, the guide roller 21a, and the tilting guide 21b of the first coaster 20 and the second coaster 21, respectively. The leader block 104 then passes the left side of the tape guide roller 30a before it is finally inserted into the insertion slit 31a of the take-up reel 31.

Figure 10:
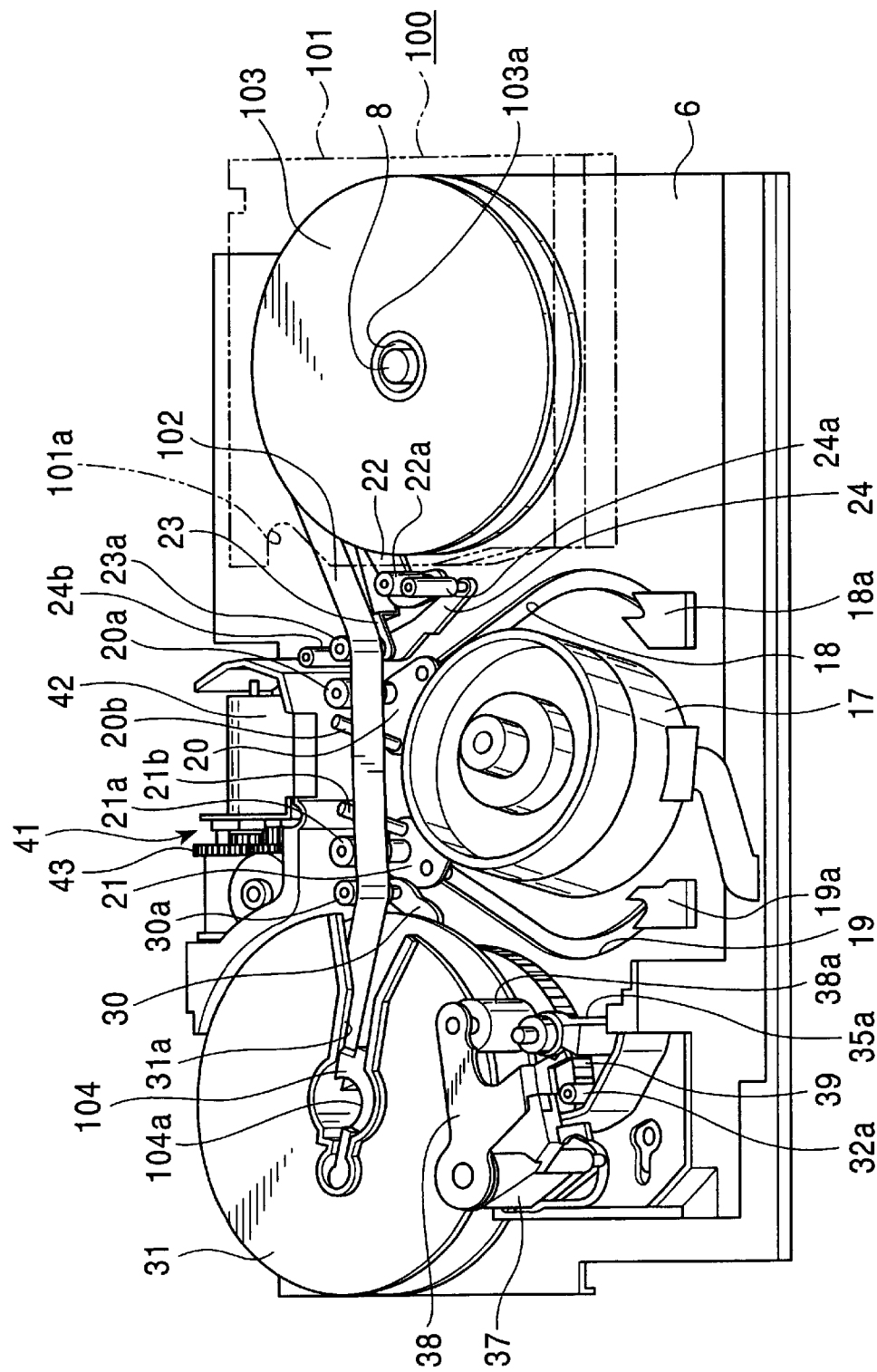
FIG. 10 is a schematic perspective view illustrating a state wherein the tape-shaped recording medium has been drawn out of a tape cassette case.
Figure 11:
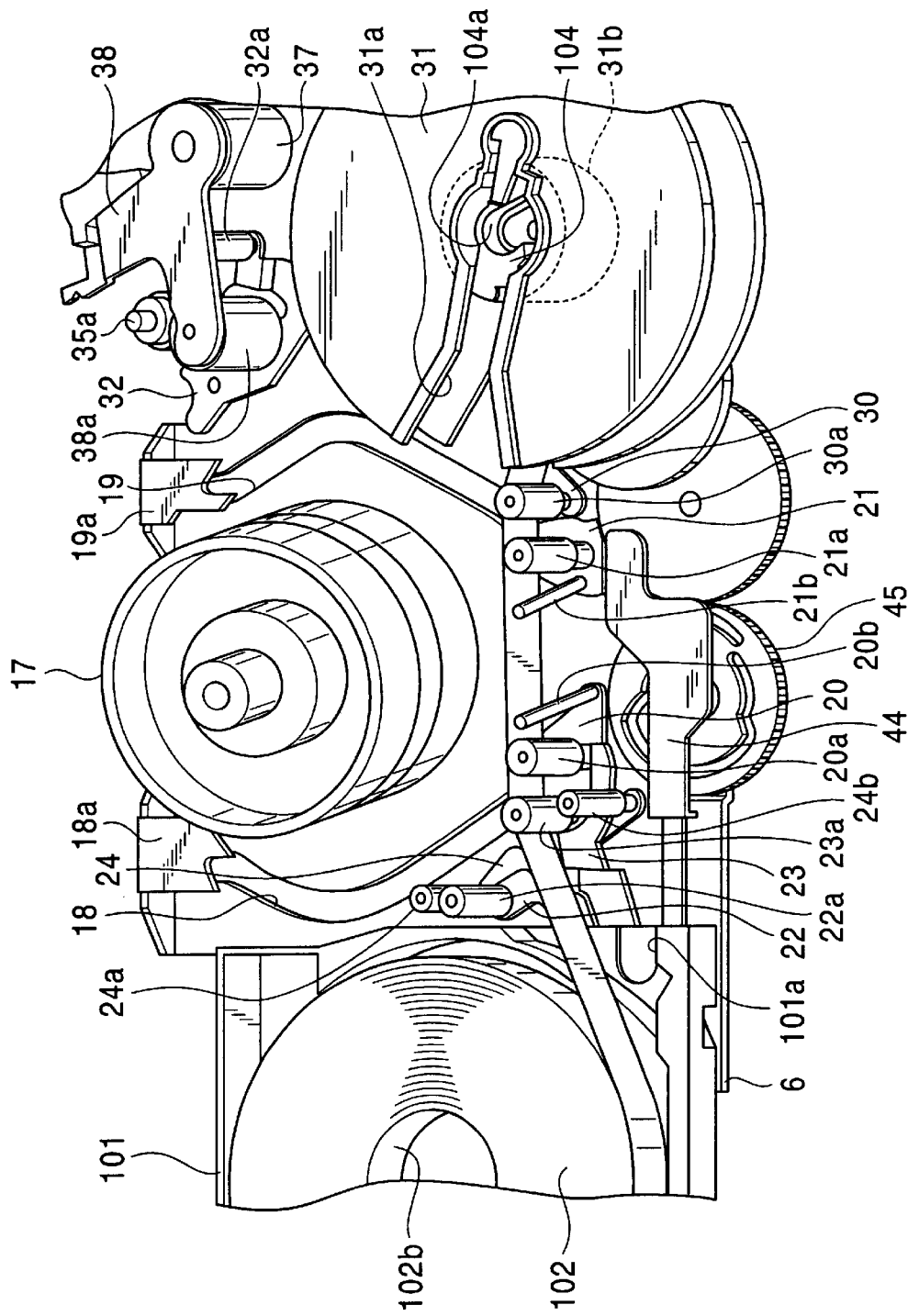
FIG. 11 is a schematic enlarged perspective view of an essential section illustrating a state wherein the tape-shaped recording medium has been drawn out of a tape cassette case.

The moment the leader block 104 is inserted to the center of the take-up reel 31, the movement of the moving base 15a is stopped, and the moment the leader block 104 is installed at the center of the take-up reel 31, the fitting shaft is removed from the fitting hole 104a (refer to FIGS. 10 and 11). In the state wherein the leader block 104 has been installed at the center of the take-up reel 31, the tape-shaped recording medium 102 is guided by being contacted from the left by a tape guide roller 23a of the first tape guide arm 23 and a tape guide roller 30a of the second tape guide arm 30, as shown in FIGS. 10 and 11. Thus, the operation for drawing out the tape-shaped recording medium 102 is completed.

In the tape drive 1, the transporter block 9 for loading the tape-shaped recording medium 102 is disposed on the right side of the tape drive 1, and the outlet 101a of the tape cassette 100 retained by the cassette holder 7 is positioned on the same right side where the transporter block 9 is located, thus contributing to a reduction in the size of the tape drive 1 with a simpler mechanism. It is not necessary to position the transporter block 9 and the outlet 101a on the right side; disposing them on the same side makes it possible to reduce the size of the tape drive by simplifying the mechanism.

Moreover, in the tape drive 1, the drum 17, the driving device 41, etc. are disposed between the tape reel 103 and the take-up reel 31, so that the installation space can be saved accordingly, contributing to the compactness of the tape drive 1.

The descriptions will now be given of the operation for setting the non-winding feed mode with reference to FIG. 12 through FIG. 14.

In the state wherein the leader block 104 has been installed at the center of the take-up reel 31, as set forth above, the pull-back guide arm 22 is circularly moved in a direction P1 shown in FIG. 5, and the tension regulator lever 24 is circularly moved in a direction R1 so as to set the non-winding feed mode. In the non-winding feed mode, the pull-back guide roller 22a of the pull-back guide arm 22 and the second guide roller 24b of the tension regulator lever 24 are brought into contact with the tape-shaped recording medium 102. In addition, the first tape guide arm 23 remains still, so that the tape guide roller 23a is also in contact with the tape-shaped recording medium 102, as shown in FIG. 12.

In the non-winding feed mode, the tape-shaped recording medium 102 is fed at high speed to perform so-called fast feed or rewinding. In the fast forward feed mode (UW-FF mode), the take-up reel motor 49 is run to feed the tape-shaped recording medium 102 from the tape reel 103 to the take-up reel 31 to be taken up by the take-up reel 31. In the fast reverse feed mode (UW-REW mode), the tape reel motor 47 is run to feed the tape-shaped recording medium 102, which has been taken up by the take-up reel 31, from the take-up reel 31 to the tape reel 103 to be taken up by the tape reel 103.

Figure 12:
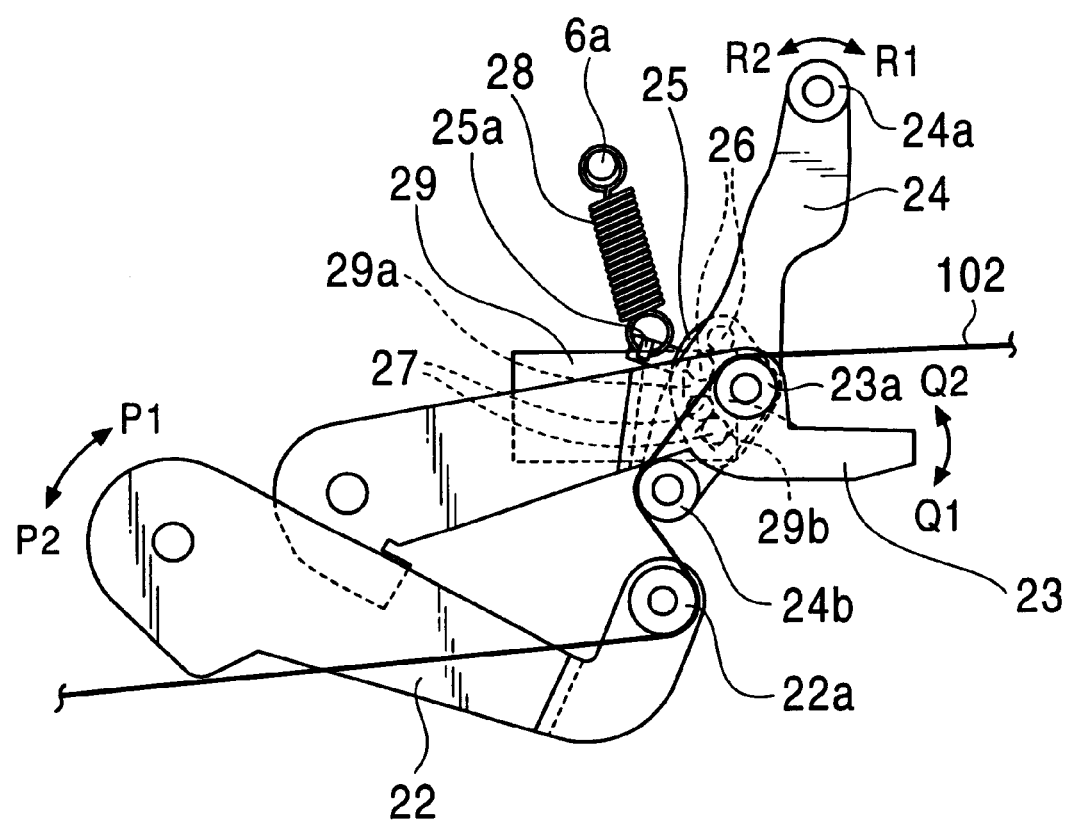
FIG. 12 is an enlarged top plan view showing a positional relationship among the pull-back guide arm, the tape guide arm, and the tension regulator lever in a non-winding feed mode.
Figure 13:
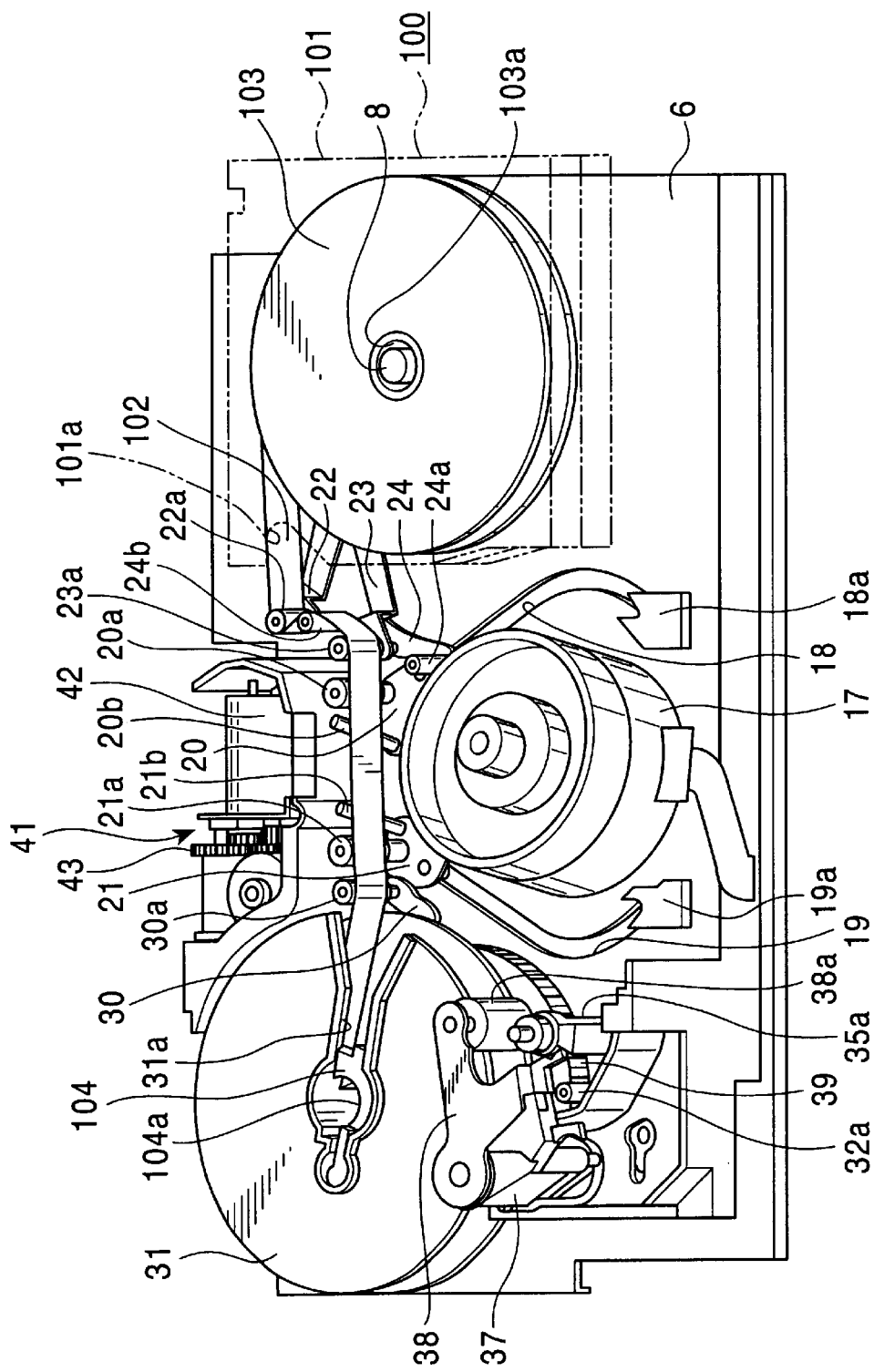
FIG. 13 is a schematic perspective view showing a state wherein the non-winding feed mode has been set.
Figure 14:
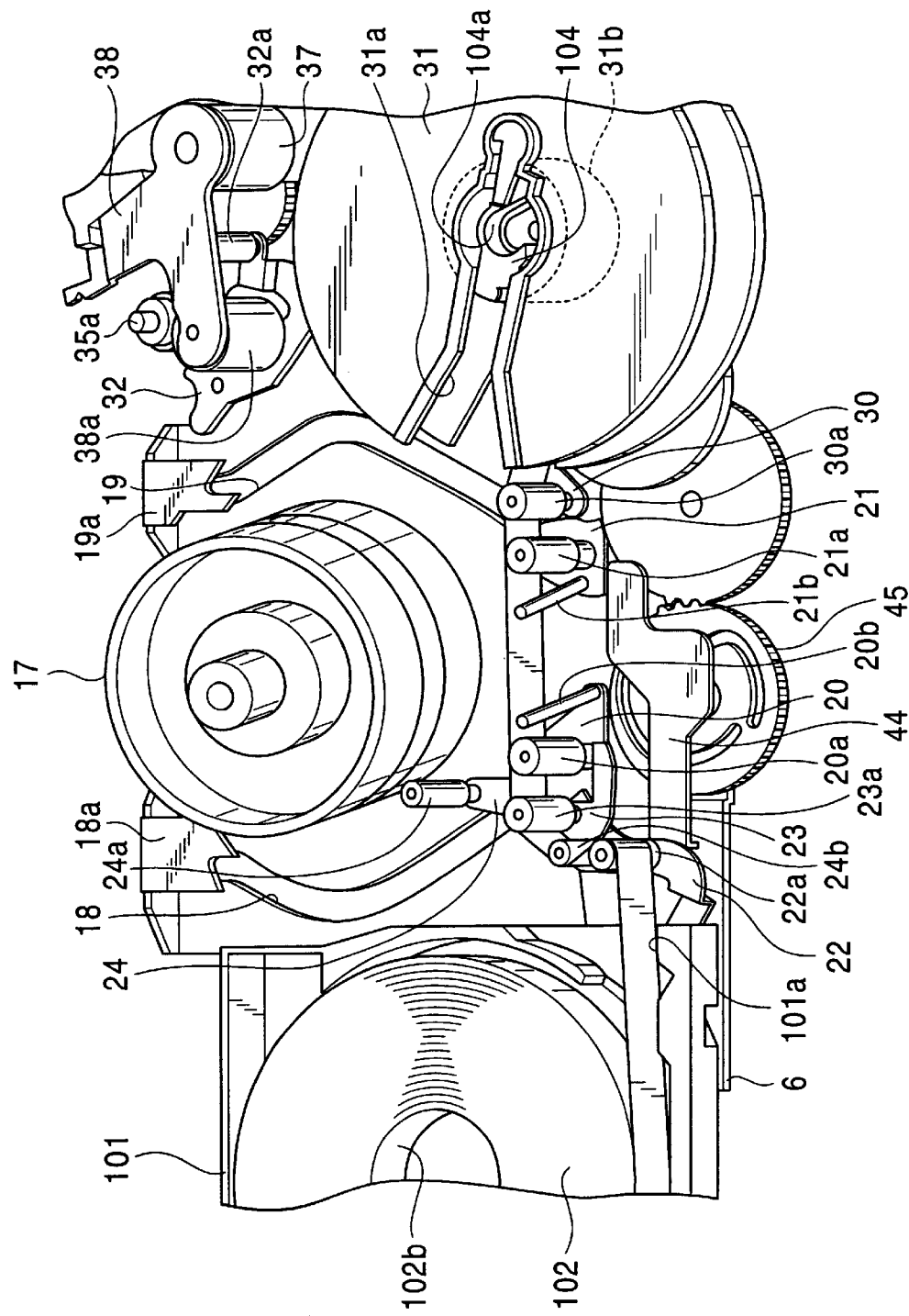
FIG. 14 is a schematic enlarged perspective view of an essential section showing the state wherein the non-winding feed mode has been set.

In the non-winding feed mode, the tape-shaped recording medium 102 is fed under a predetermined tension (see FIG. 12 through FIG. 14). The tension is applied to the tape-shaped recording medium 102 by the spring force of the tensile coil spring 28 provided in a tensioned state between the spring hook 25a of the magnet mounting member 25 provided on the tension regulator lever 24 and the spring hook 6a of the chassis 6, the spring force being applied to the tape-shaped recording medium 102 through the intermediary of the second guide roller 24b brought into contact with the tape-shaped recording medium 102. At this time, the sensor 29b of the first tension detecting board 29 detects the magnets 27 and 27 disposed on the magnet mounting member 25 so as to detect the position of the tension regulator lever 24 which has been circularly moved. Based on the detection result, the rotational speed of the take-up reel motor 49 or the tape reel motor 47 is controlled so that a constant tension is always applied to the tape-shaped recording medium 102.

Thus, the tape-shaped recording medium 102 is fed under a constant tension without being wound around the drum 17, allowing the tape-shaped recording medium 102 to be fed at high speed without causing damage to the tape. Moreover, since the constant tension is applied, such a problem as the one in which the tape-shaped recording medium 102 slides up and slips off the tilting guides 20b, 21b, etc. can be prevented.

The non-winding feed mode can be set in the tape drive 1, providing the following advantage. If, for example, a damaged portion is found in the tape-shaped recording medium 102 while information signals are being recorded or reproduced, then the non-winding feed mode can be temporarily set immediately before the damaged portion is brought into slidable contact with the head of the drum 17 to obviate a disturbance or the like of an image.

Furthermore, the tape drive 1 uses the single-reel type tape cassette 100 in which the tape-shaped recording medium 102 is drawn out of the case 101 and fed. Hence, there is a sufficient space for disposing the tension regulator lever 24 having the guide roller 24b for applying the constant tension to the tape-shaped recording medium 102. With this arrangement, proper fast feed can be accomplished by disposing the tension regulator lever 24.

The descriptions will now be given of the operation for setting the winding feed mode with reference to FIG. 15 through FIG. 18.

Figure 15:
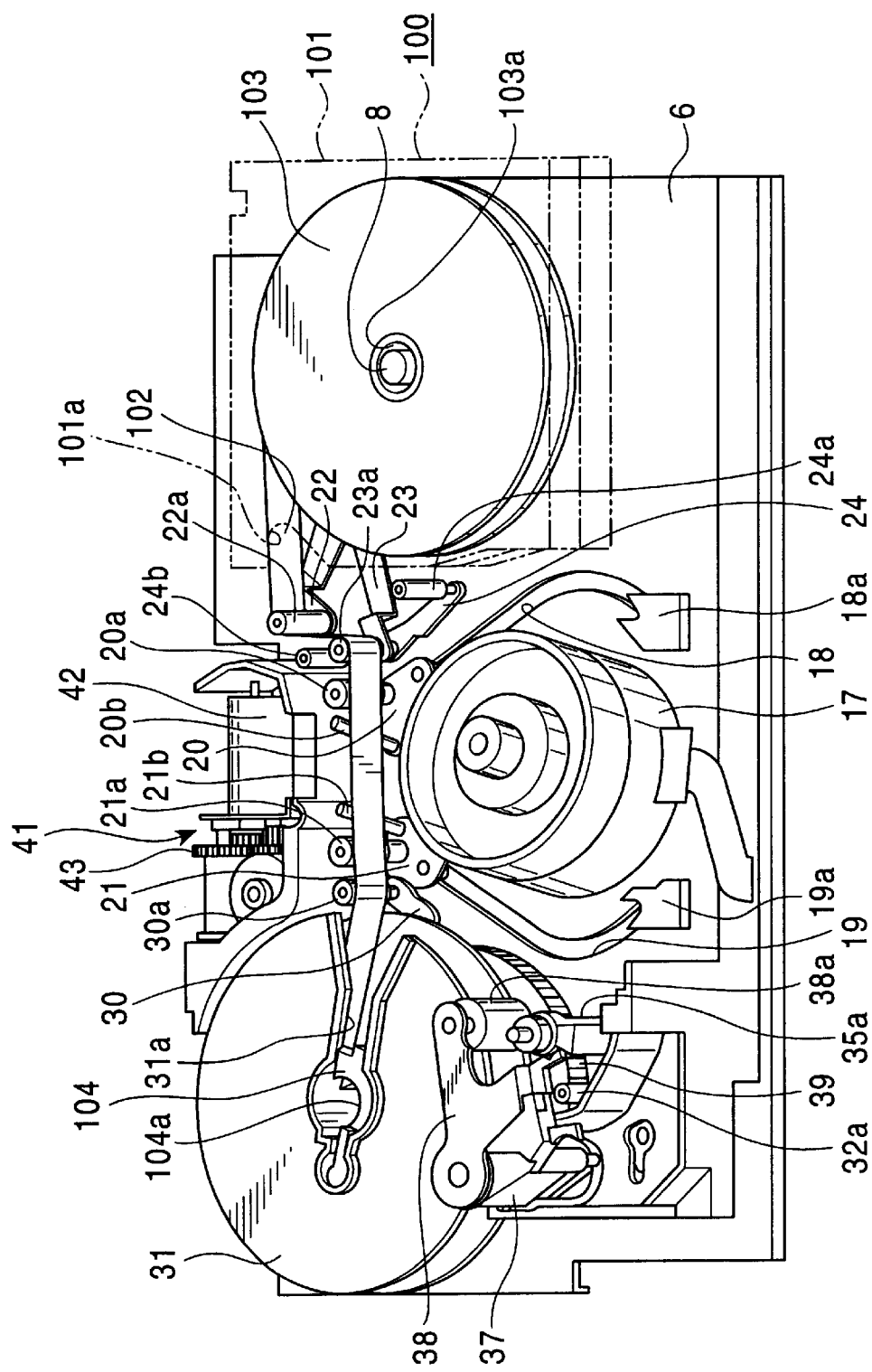
FIG. 15, as well as FIG. 16 and FIG. 17, illustrate how the tape-shaped recording medium is wrapped around a drum, FIG. 15 being a schematic perspective view wherein the tension regulator lever has been circularly moved to secure a path along which a first coaster moves.

In the state wherein the non-winding feed mode has been set, as described above, the tension regulator lever 24 is circularly moved in a direction R2 shown in FIG. 12 to be retracted from above the guide slot 18. This secures the moving path for the first coaster 20, as shown in FIG. 15.

Figure 16:
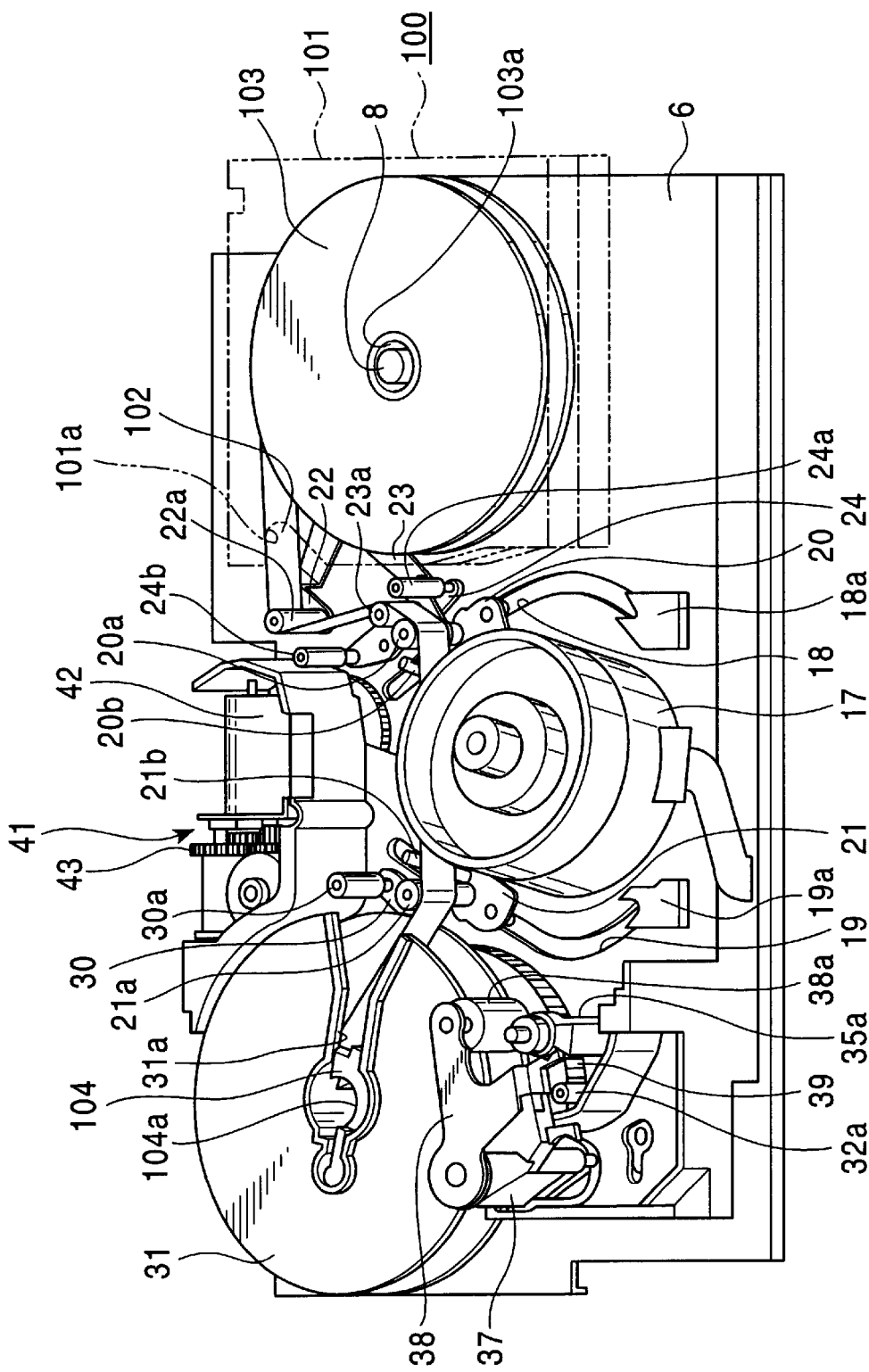
FIG. 16 is a schematic perspective view illustrating a state wherein the first coaster and a second coaster are being moved.

When the moving path for the first coaster 20 is secured, the first coaster 20 and the second coaster 21 are guided by the guide slots 18 and 19, respectively, to move to the left, as shown in FIG. 16. At this time, the first tape guide arm 23 is moved in a direction Q2 shown in FIG. 12 to bring the tape guide roller 23a into contact with the tape-shaped recording medium 102, thereby guiding the tape-shaped recording medium 102, as shown in FIG. 16.

Figure 17:
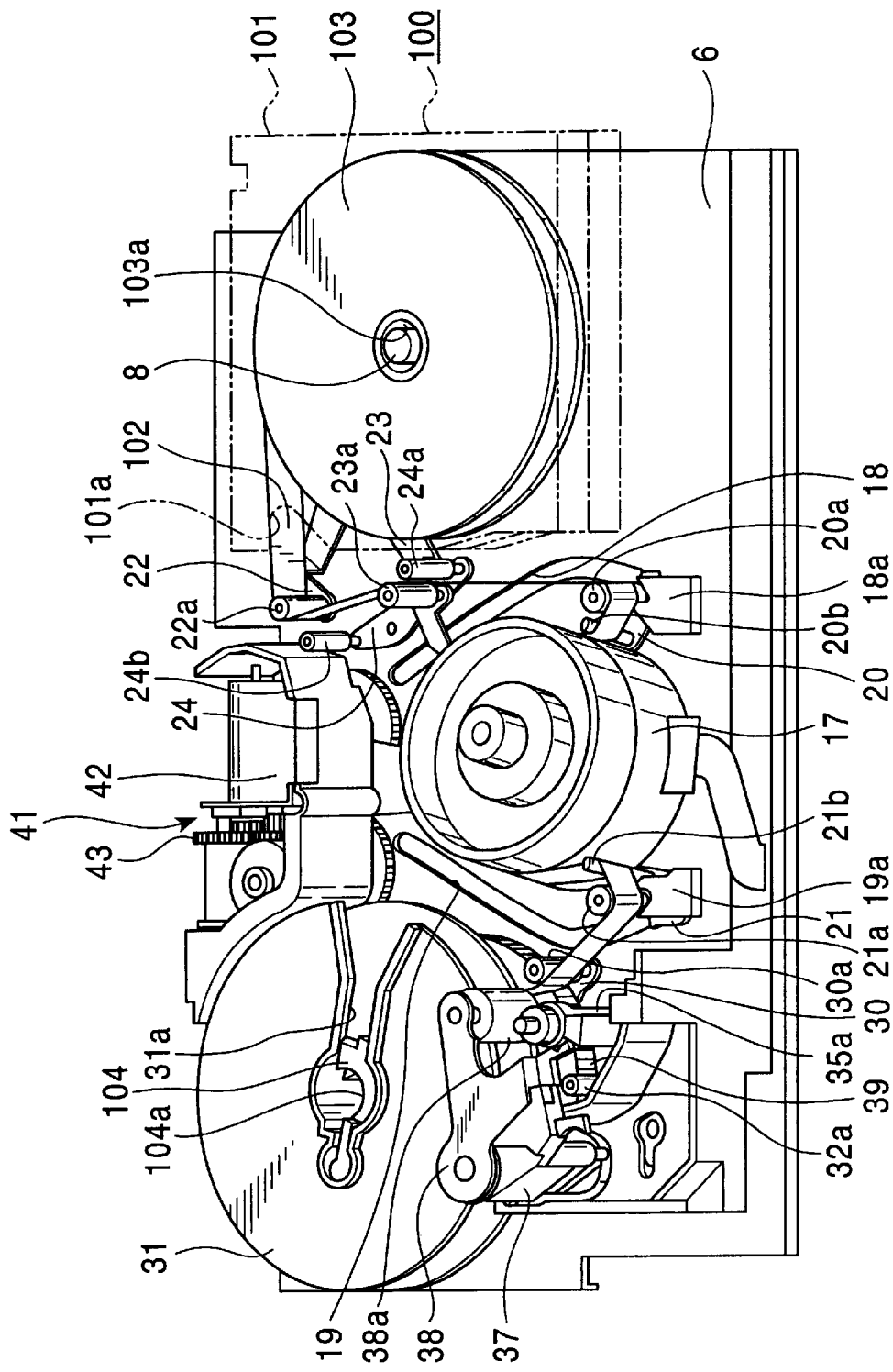
FIG. 17 is a schematic perspective view illustrating the tape-shaped recording medium that has been wound around the drum.

As the first coaster 20 and the second coaster 21 move to the left, the tape-shaped recording medium 102 is pressed leftward by the guide rollers 20a, 21a and the tilting guides 20b, 21b, and the first coaster 20 and the second coaster 21 is restricted in their movement by the stoppers 18a and 19a, respectively, and stopped at their left stroke ends, as shown in FIG. 17. When the first coaster 20 and the second coaster 21 are positioned at their left stroke ends, the portion of the tape-shaped recording medium 102 that is positioned between the first coaster 20 and the second coaster 21 is wound around the drum 17 from the right side, as illustrated in FIG. 17.

In the state wherein the tape-shaped recording medium 102 has been wound around the drum 17, as described above, the portion of the tape-shaped recording medium 102 that is positioned between the guide roller 20a of the first coaster 20 and the guide roller 21a of the second coaster 21 is wound around the drum 17. At the same time, the tape-shaped recording medium 102 is pulled back by the guide rollers 20a and 21a, so that the tape-shaped recording medium 102 is approximately shaped like "M", as observed from above. This is known as "M-shape loading."

When the tape-shaped recording medium 102 is wound around the drum 17, the second tape guide arm 30 is circularly moved in the direction so that the tape guide roller 30a is circularly moved toward the tape-shaped recording medium 102, as shown in FIG. 17.

Figure 18:
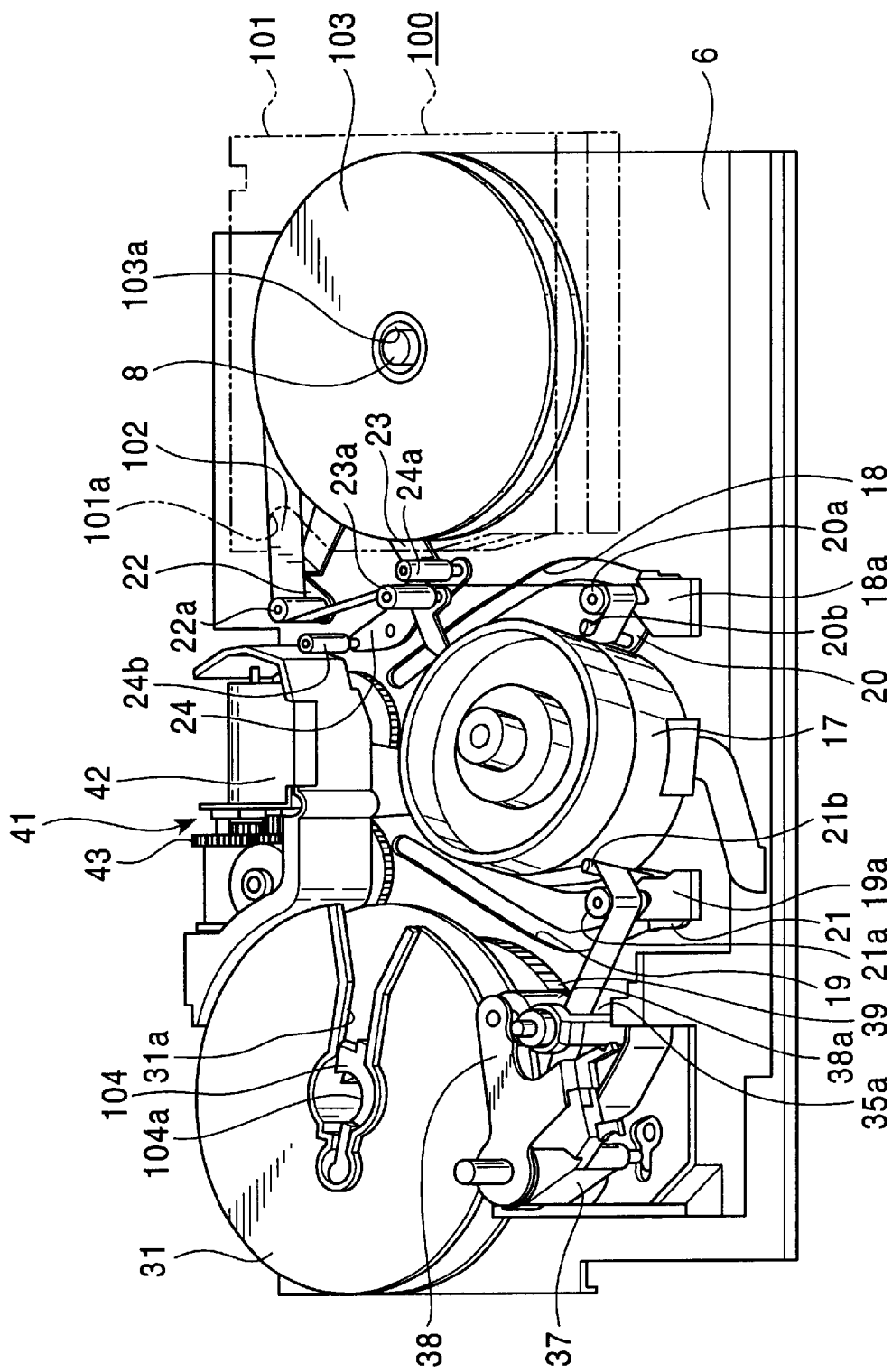
FIG. 18 is a schematic perspective view illustrating a state wherein a fast reverse feed mode (REW mode) has been set.
Figure 19:
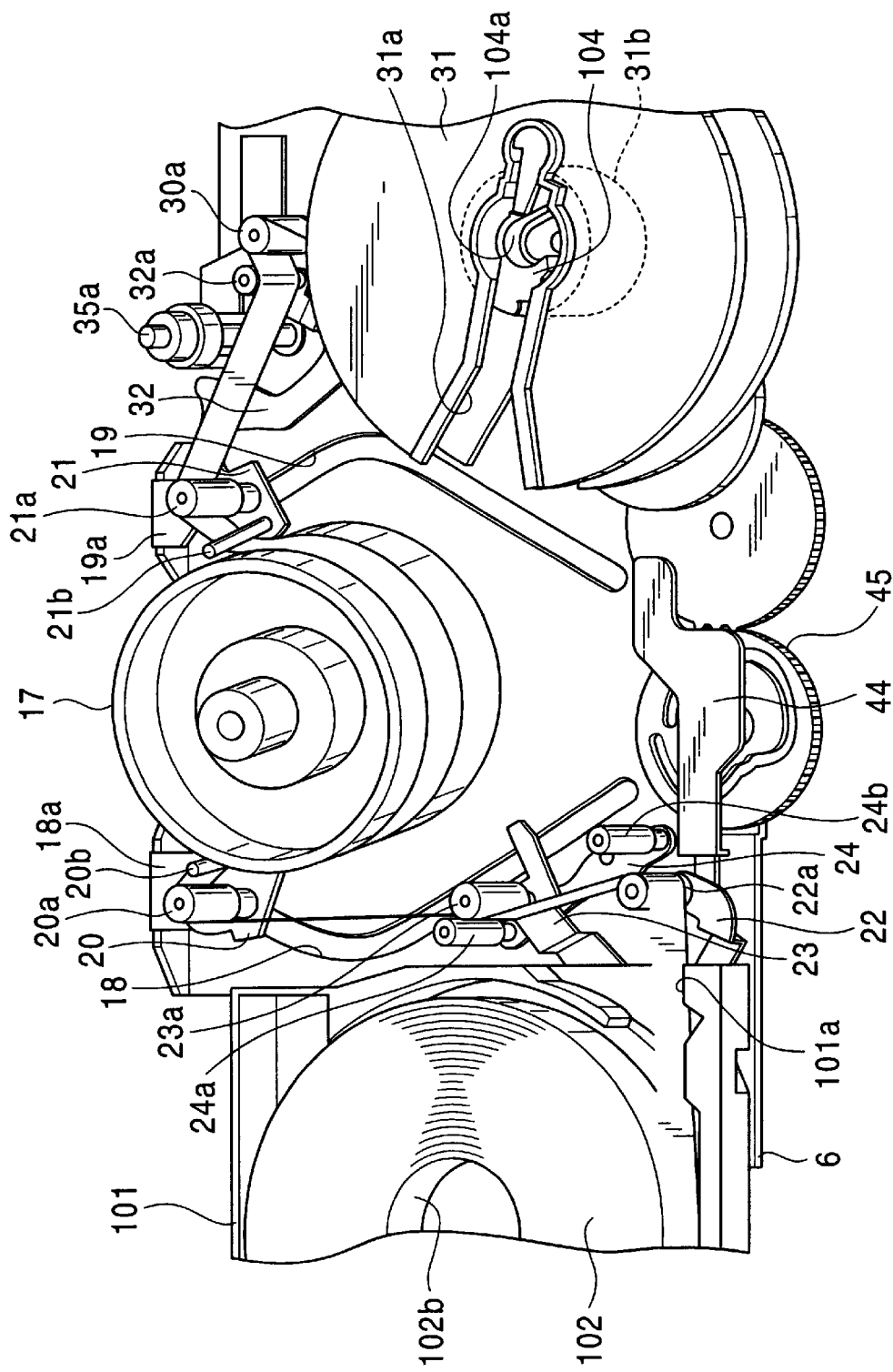
FIG. 19 is a schematic enlarged perspective view of an essential section illustrating the state wherein the fast reverse feed mode (REW mode) has been set.
Figure 20:
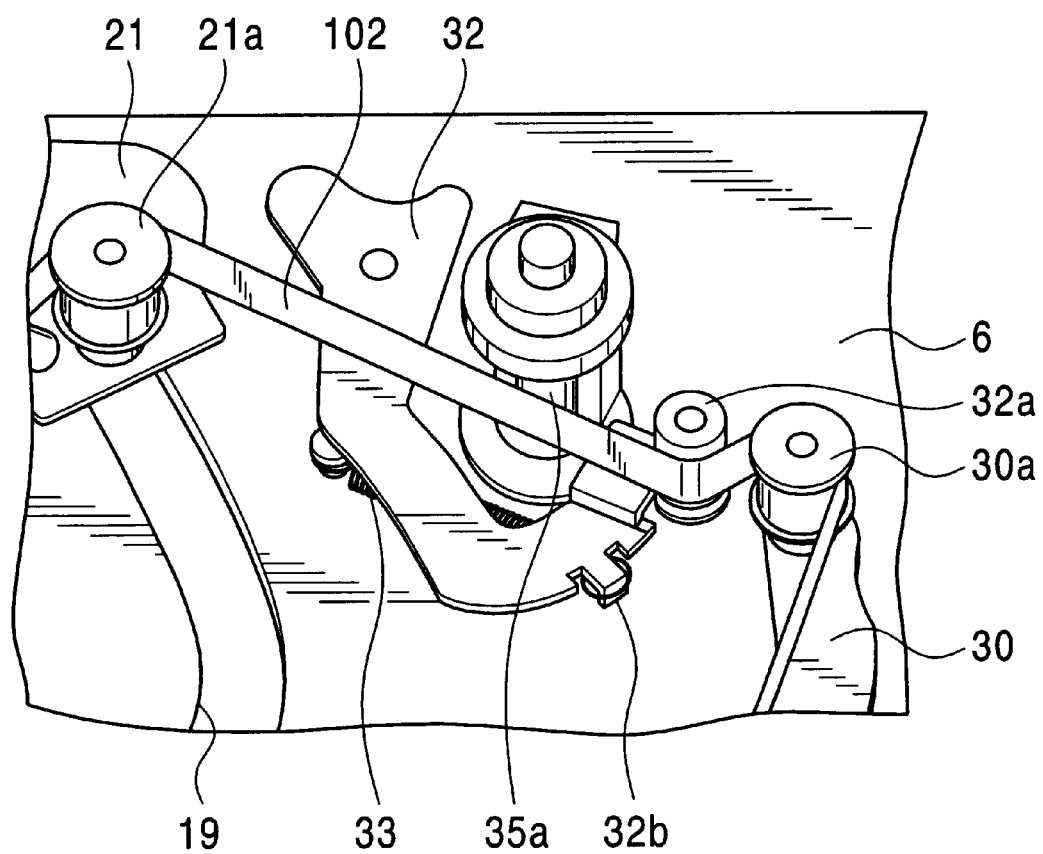
FIG. 20 is a schematic enlarged perspective view illustrating a positional relationship mainly among a second tape guide arm and the tension regulator arm in the fast reverse feed mode (REW mode)

In the state wherein the tape-shaped recording medium 102 has been wound around the drum 17, when the tension regulator lever 32 is circularly moved to bring the guide roller 32a into contact with the tape-shaped recording medium 102, the fast reverse feed mode (REW mode) is set in which the tape-shaped recording medium 102 is fed from the take-up reel 31 to the tape reel 103 at high speed (refer to FIG. 18 through FIG. 20). In the fast reverse feed mode, the tape-shaped recording medium 102 is guided by the pull-back guide roller 22a of the pull-back guide arm 22 and the tape guide roller 23a of the first tape guide arm 23, and is in no contact with neither the first guide roller 24a nor the second guide roller 24b of the tension regulator lever 24 as shown in FIG. 21.

In the fast reverse feed mode, the tape-shaped recording medium 102 is fed under a constant tension (refer to FIGS. 19 and 20). The tension is applied to the tape-shaped recording medium 102 by the spring force of the tensile coil spring 33 provided in a tensioned state between the spring hook 32b of the tension regulator lever 32 and the spring hook 6b of the chassis 6, the spring force being applied to the tape-shaped recording medium 102 through the intermediary of the guide roller 32a brought into contact with the tape-shaped recording medium 102. At this time, a sensor (not shown) of the second tension detecting board 34 detects a pair of magnets disposed on a magnet mounting member (not shown) of the tension regulator lever 32 so as to detect the position of the tension regulator lever 32 which has been circularly moved. Based on the detection result, the rotational speed of the tape reel motor 47 is controlled so that a constant tension is always applied to the tape-shaped recording medium 102.

Figure 21:
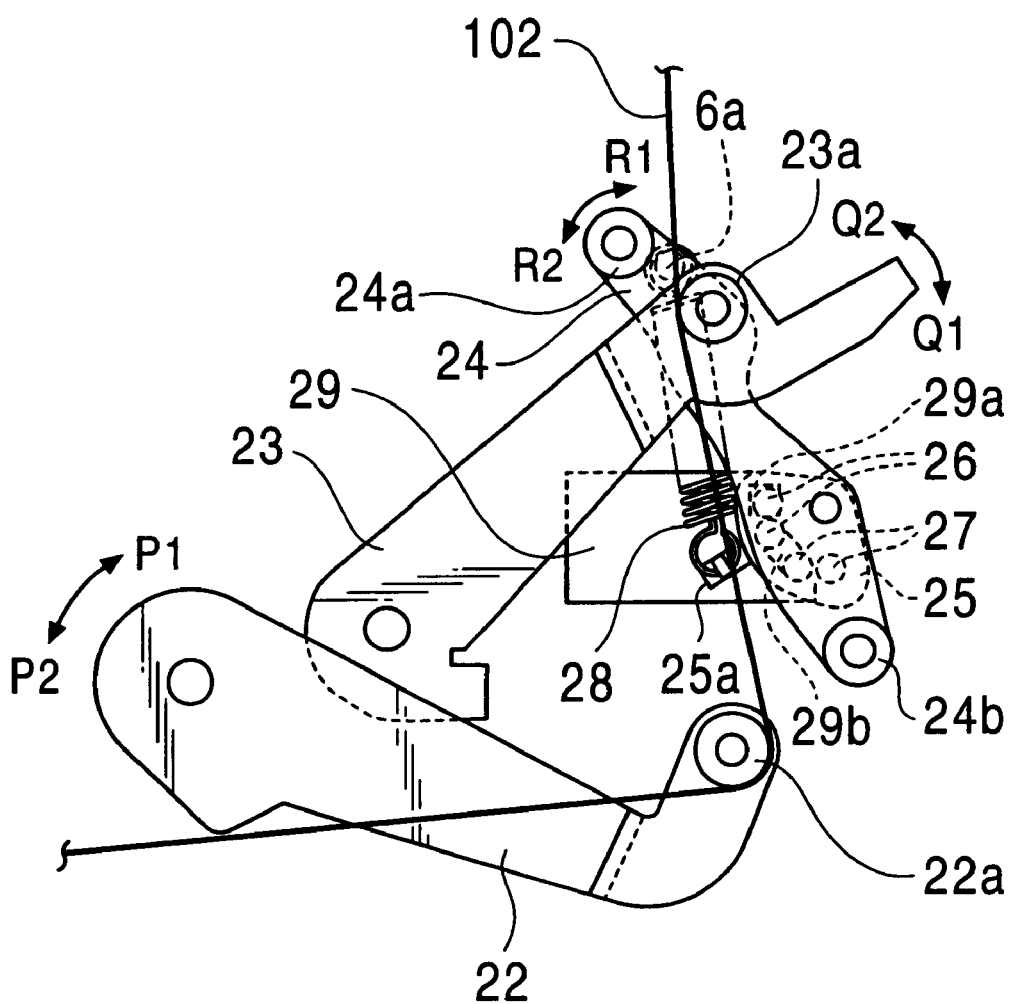
FIG. 21 is an enlarged top plan view illustrating a positional relationship among the pull-back guide arm, the tape guide arm, and the tension regulator lever in the fast reverse feed mode (REW mode)

From the fast reverse feed mode, the guide roller 32a of the tension regulator lever 32 is moved away from the tape-shaped recording medium 102, and the tension regulator lever 24 is circularly moved in the direction R1 shown in FIG. 21 to bring the first guide roller 24a into contact with the tape-shaped recording medium 102. This sets the fast forward feed mode (FF mode) in which the tape-shaped recording medium 102 is fed from the tape reel 103 to the take-up reel 31 (refer to FIG. 22 through FIG. 25). In the fast forward feed mode, the tape-shaped recording medium 102 is guided by the pull-back guide roller 22a of the pull-back guide arm 22 and the tape guide roller 23a of the first tape guide arm 23, as shown in FIG. 25.

Figure 22:
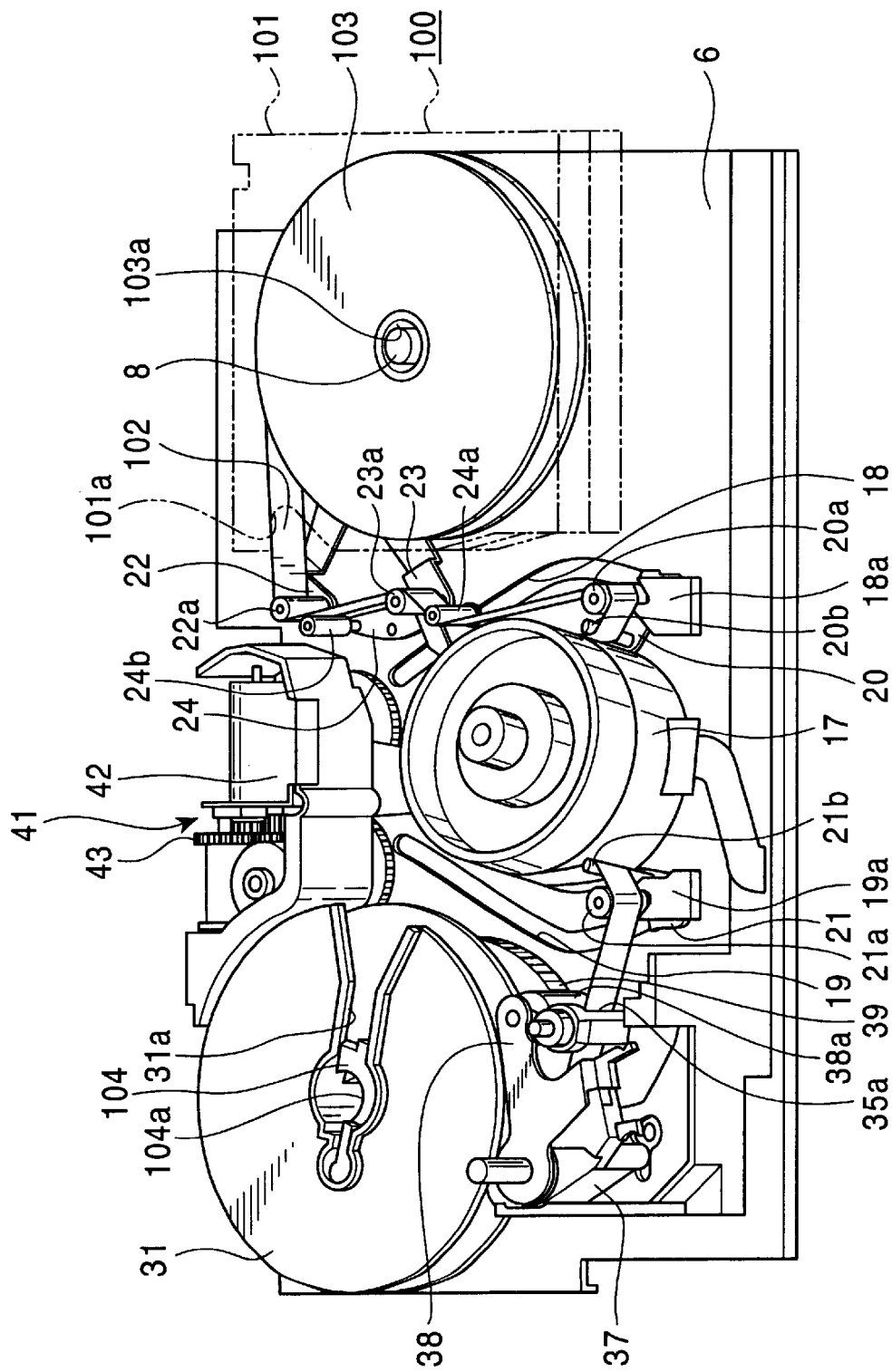
FIG. 22 is a schematic perspective view illustrating a state wherein a fast forward feed mode (FF mode) has been set.
Figure 23:
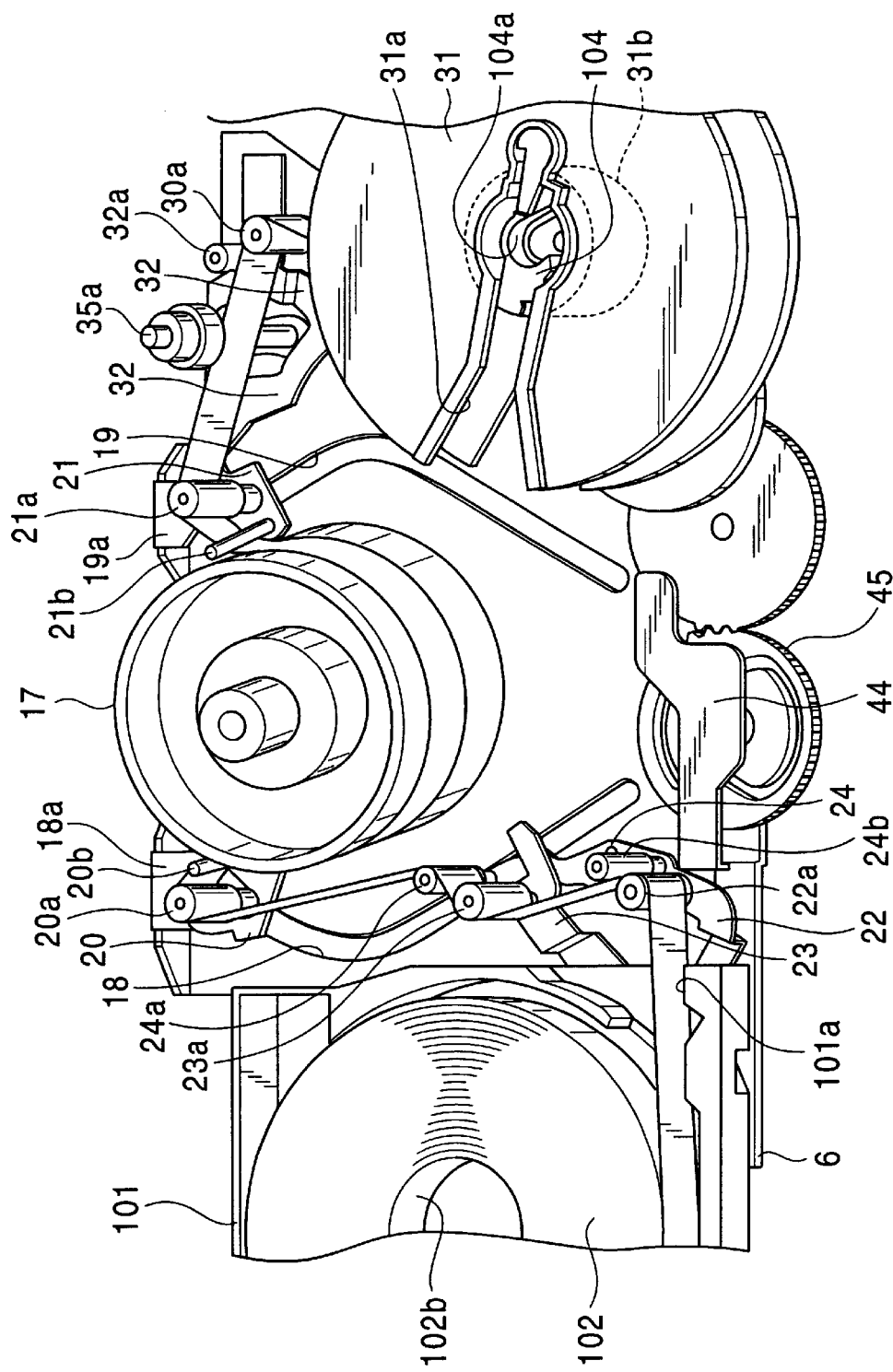
FIG. 23 is a schematic enlarged perspective view of an essential section illustrating the state wherein the fast forward feed mode (FF mode) has been set.
Figure 24:
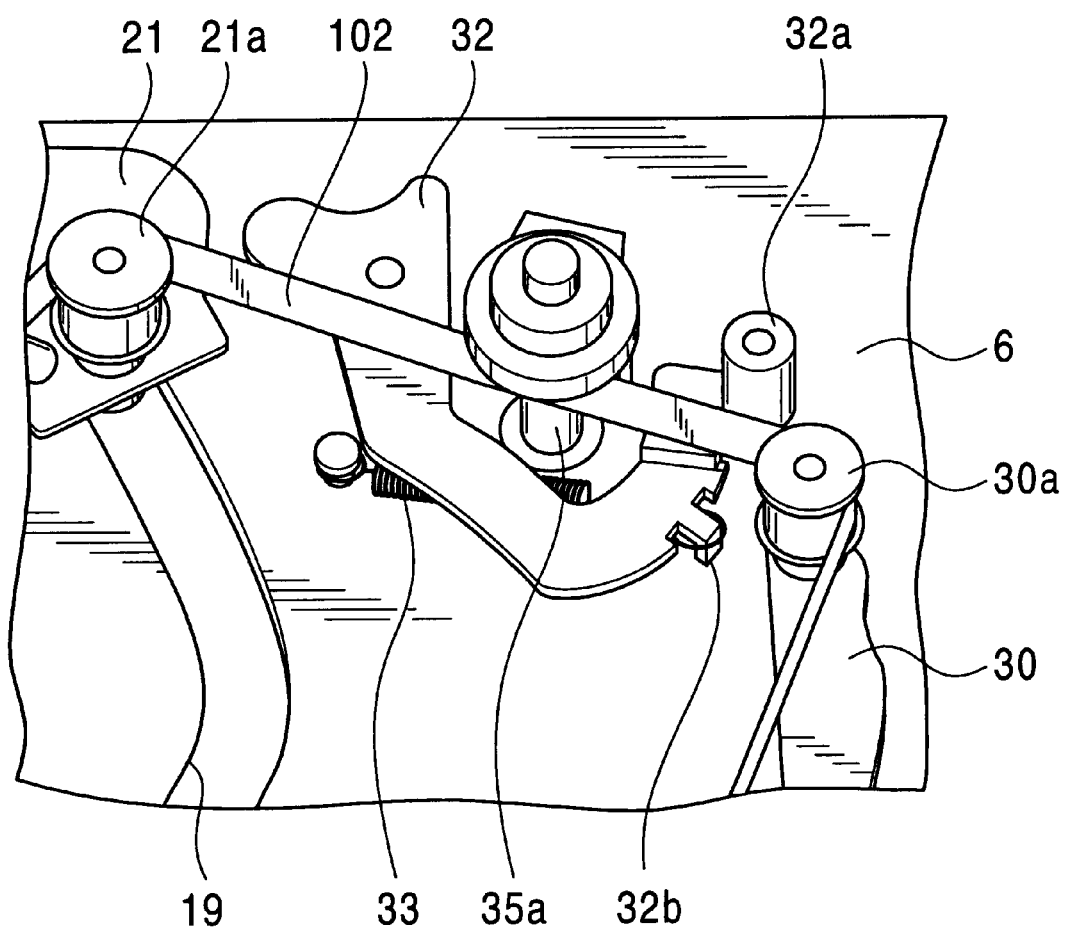
FIG. 24 is a schematic enlarged perspective view illustrating a positional relationship mainly among the second tape guide arm and the tension regulator arm in the fast forward feed mode (FF mode)
Figure 25:
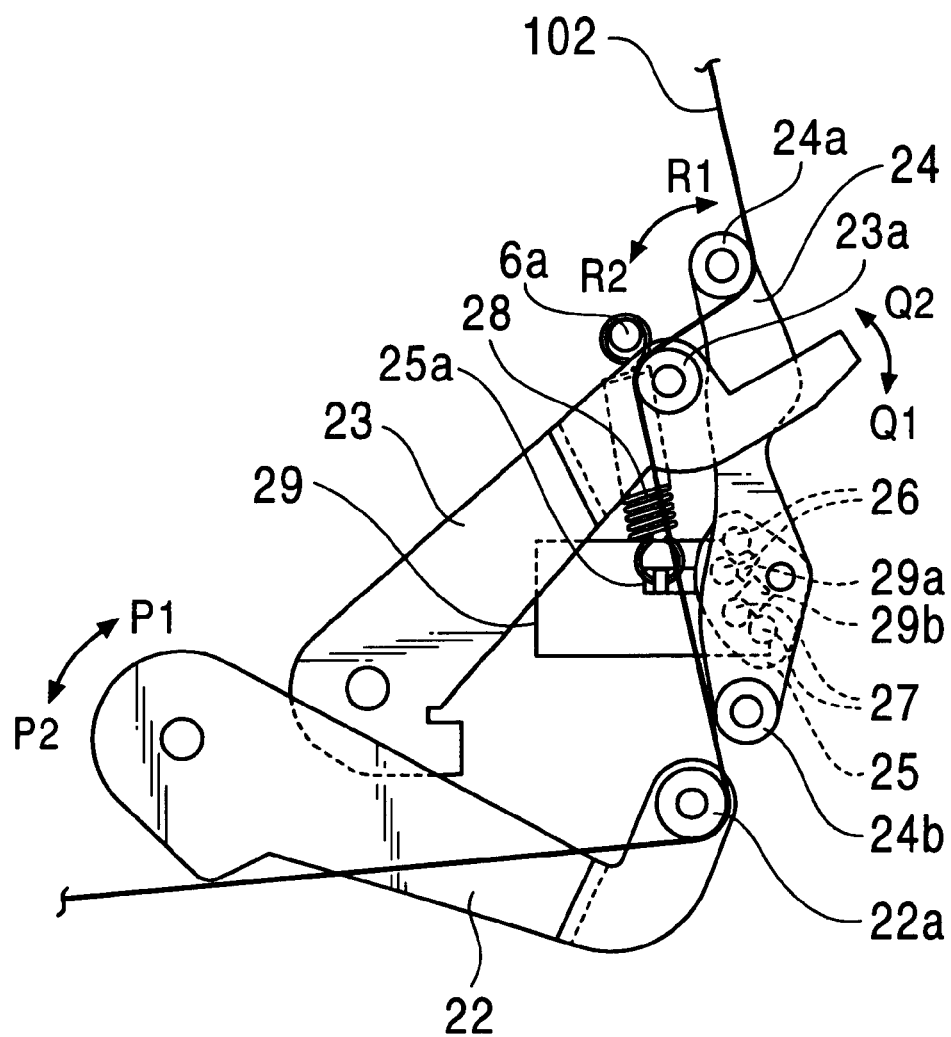
FIG. 25 is an enlarged top plan view illustrating a positional relationship among the pull-back guide arm, the tape guide arm, and the tension regulator lever in the fast forward feed mode (FF mode)

In the fast forward feed mode, the tape-shaped recording medium 102 is fed under a constant tension (refer to FIGS. 22, 23, and 25). The tension is applied to the tape-shaped recording medium 102 by the spring force of the tensile coil spring 28 provided in a tensioned state between the spring hook 25a on the magnet mounting member 25 of the tension regulator lever 24 and the spring hook 6a of the chassis 6, the spring force being applied to the tape-shaped recording medium 102 through the intermediary of the first guide roller 24a brought into contact with the tape-shaped recording medium 102. At this time, the sensor 29a of the first tension detecting board 29 detects the magnets 26 and 26 disposed on the magnet mounting member 25 so as to detect the position of the tension regulator lever 24 which has been circularly moved. Based on the detection result, the rotational speed of the take-up reel motor 49 is controlled so that a constant tension is always applied to the tape-shaped recording medium 102.

Thus, the tape drive 1 is equipped with the first tension detecting device having the first guide roller 24a that is provided between the drum 17 and the tape reel 103 and applies the constant tension to the tape-shaped recording medium 102 in the fast forward feed mode, and the second tension detecting device having the guide roller 32a that is provided between the drum 17 and the take-up reel 31 and applies the constant tension to the tape-shaped recording medium 102 in the fast reverse feed mode. This arrangement ensures that the tape-shaped recording medium 102 is brought into contact with the head of the drum 17 under an appropriate pressure in any mode. Thus, such a problem in which excessive load is applied to the tape-shaped recording medium 102 can be prevented, so that the tape-shaped recording medium 102 can be protected against damage. Moreover, the highly accurate tension control makes it possible to secure stable feed of the tape-shaped recording medium 102.

Referring now to FIG. 26 through FIG. 31, the descriptions will now be given of the forward feed mode (FWD mode), which is one of the winding feed modes. In the FWD mode, the tape-shaped recording medium 102 is fed from the tape reel 103 to the take-up reel 31 to record or reproduce information signals.

In the fast forward feed mode (FF mode), the pinch roller 38a is pressed against the capstan shaft 35a through the intermediary of the tape-shaped recording medium 102 to set the forward feed mode.

Figure 26:
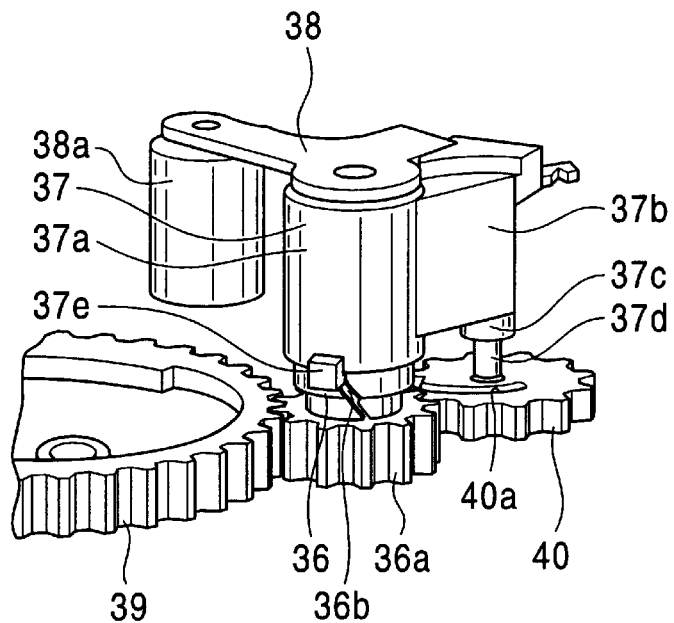
FIG. 26, as well as FIG. 27, illustrates the operation of a pinch arm supporting a pinch roller, FIG. 26 being a schematic enlarged perspective view illustrating a state wherein the pinch arm is down.
Figure 27:
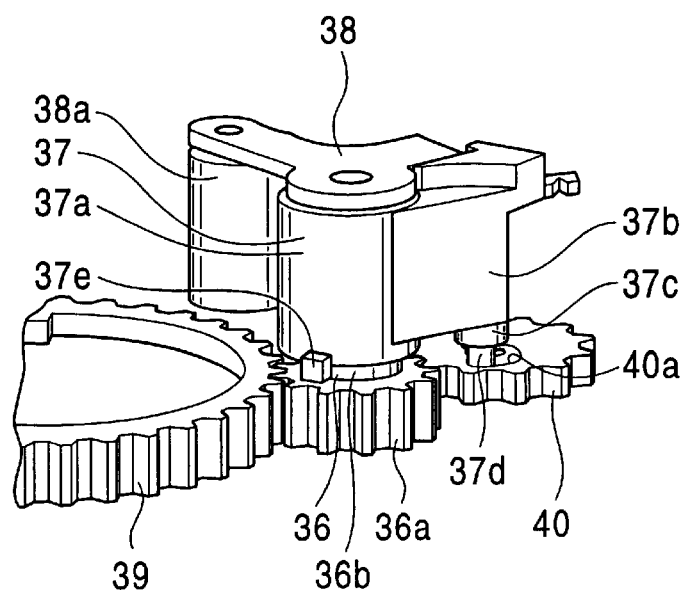
FIG. 27 is a schematic enlarged perspective view illustrating a state wherein the pinch arm has been circularly moved.
Figure 28:
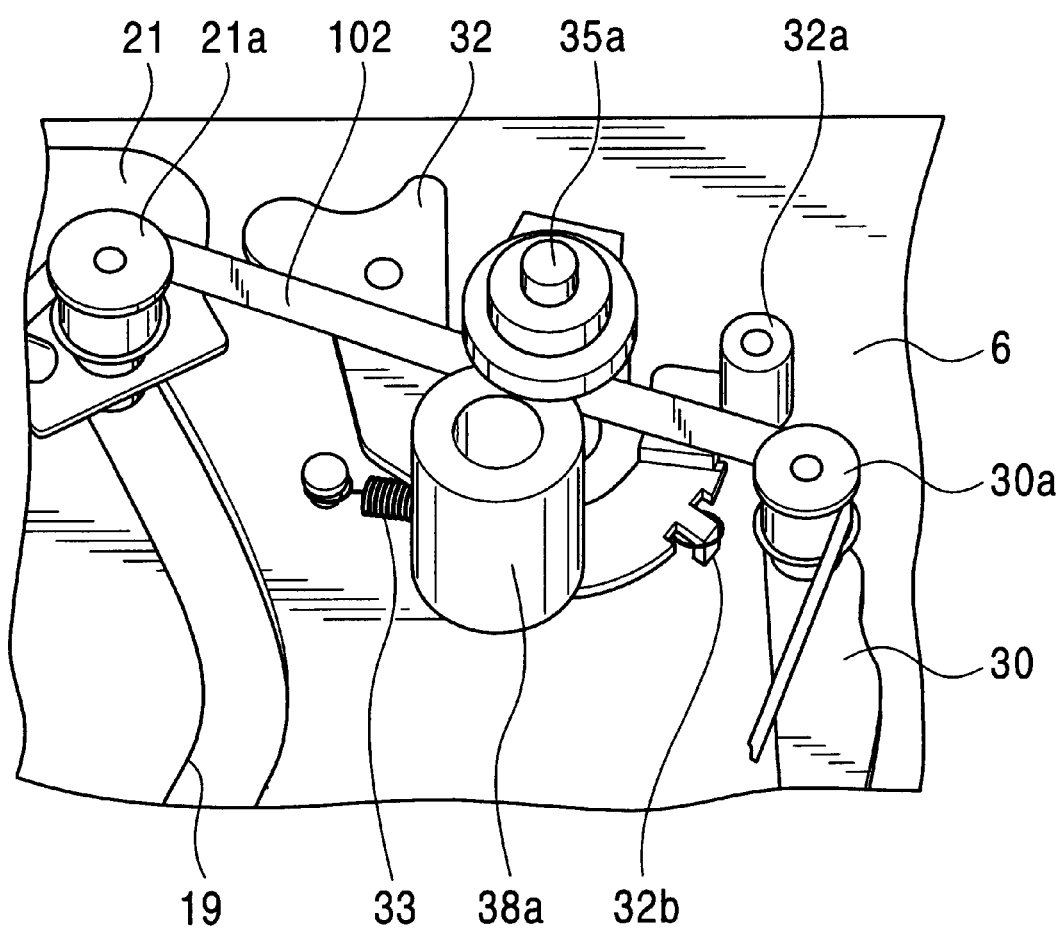
FIG. 28 is a schematic enlarged perspective view illustrating a positional relationship mainly among a second tape guide arm and a tension regulator arm in the forward feed mode (FWD mode)
Figure 29:
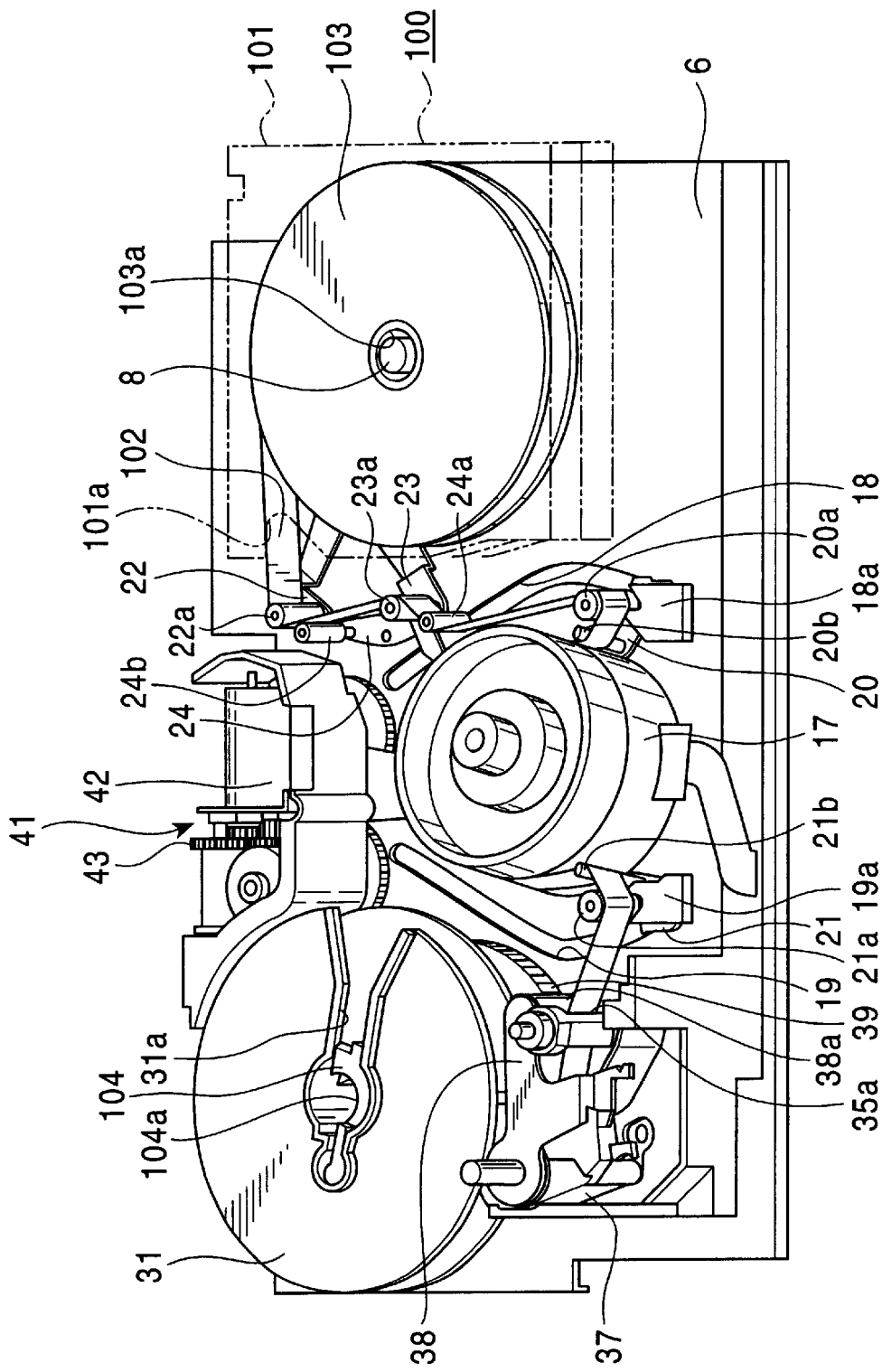
FIG. 29 is a schematic perspective view illustrating a state wherein the forward feed mode (FWD mode) has been set.
Figure 30:
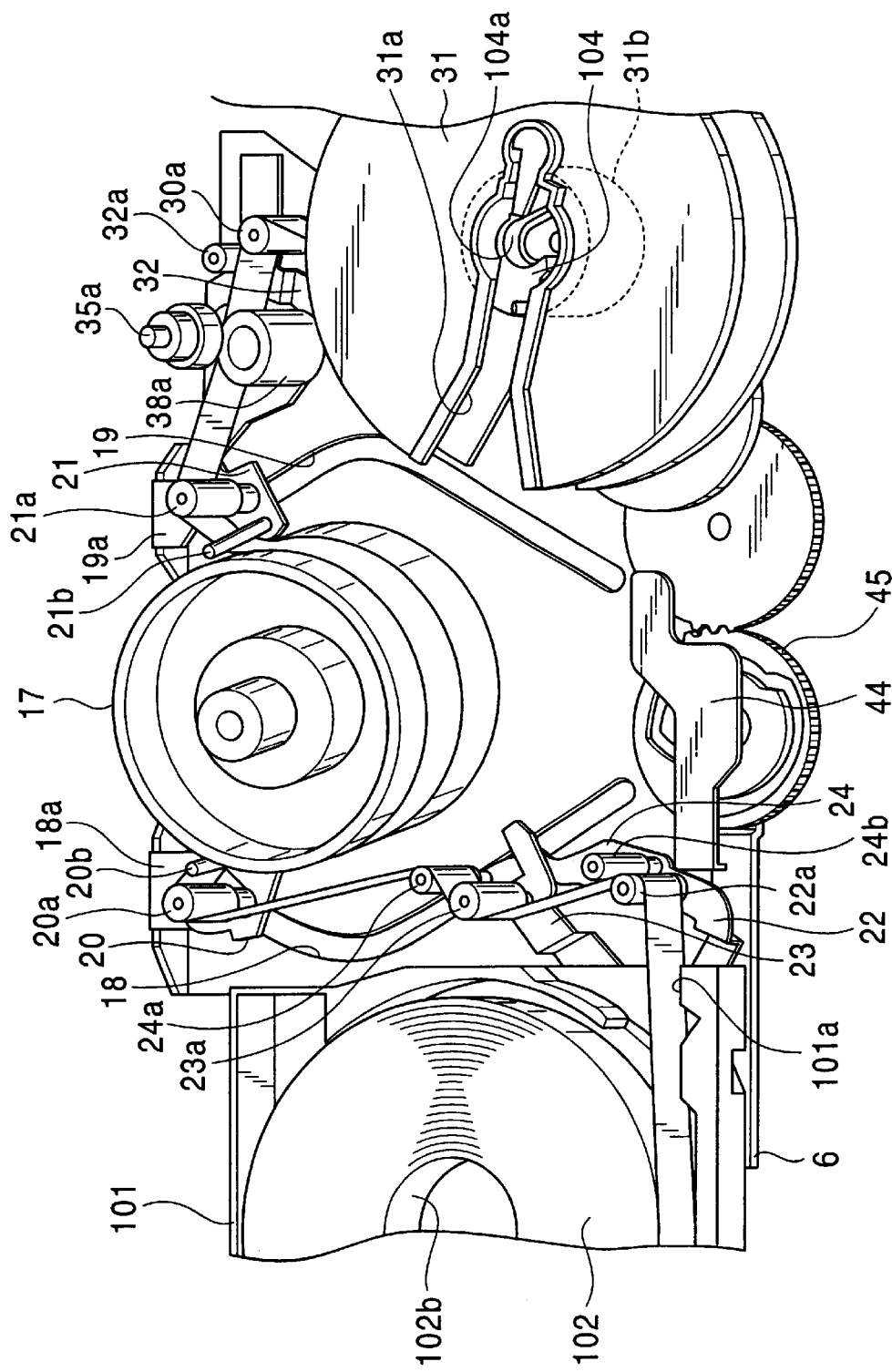
FIG. 30 is a schematic enlarged perspective view of an essential section illustrating a state wherein the forward feed mode (FWD mode) has been set.
Figure 31:
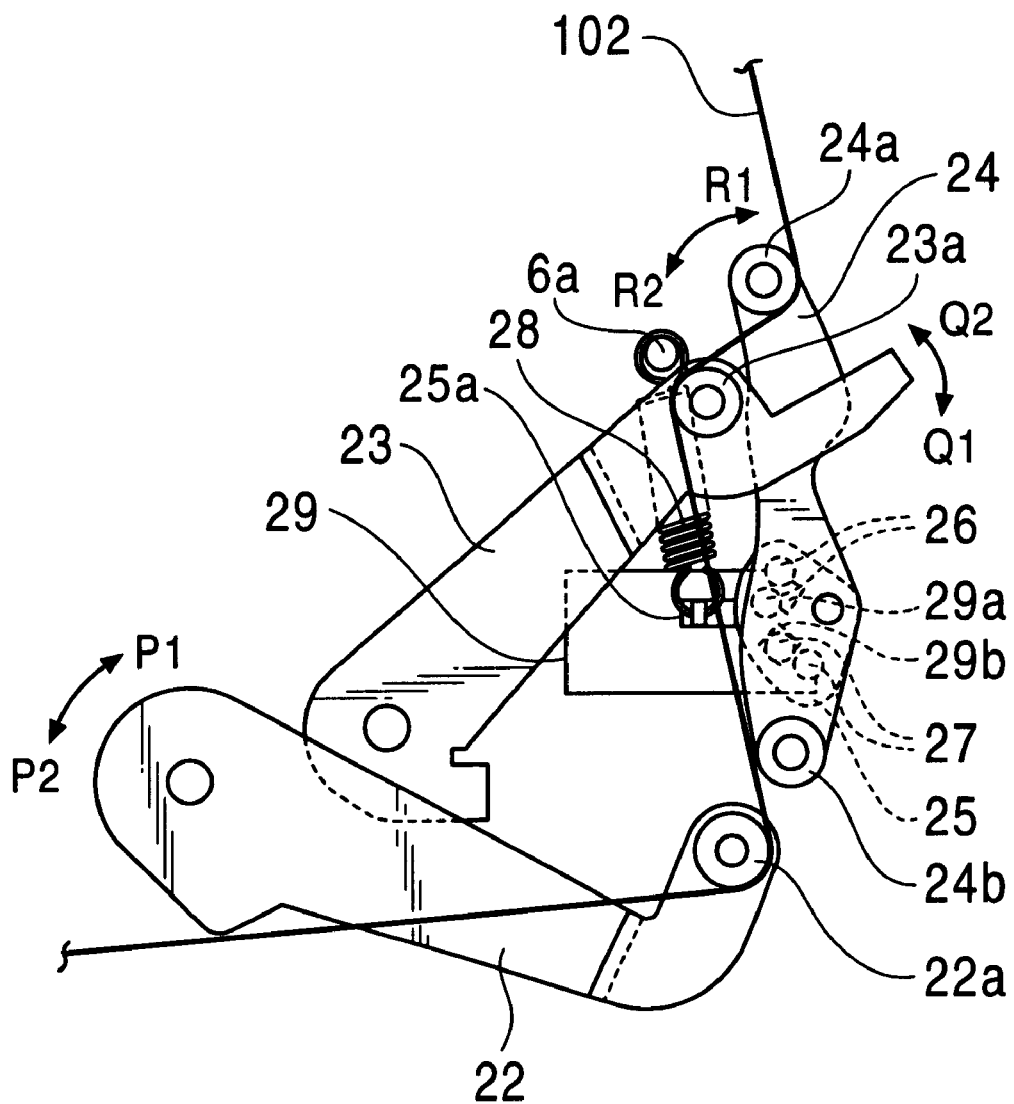
FIG. 31 is an enlarged top plan view illustrating a positional relationship among the pull-back guide arm, the tape guide arm, and the tension regulator lever in the forward feed mode (FWD mode)

Before the pinch roller 38a is pressed against the capstan shaft 35a, the pinch arm 37 is retained at its upper stroke end, which is farthest from the capstan shaft 35a, as shown in FIG. 8. To set the forward feed mode, the rotation of the rotating shaft 36 actuated by the rotation of the annular gear 39 causes the engaging protuberance 37e of the pinch arm 37 to slide in the slope cam groove 36b of the rotating shaft 36, and the pinch arm 37 moves downward, as shown in FIG. 26. When the pinch arm 37 moves down, the insertion pin 37d is inserted from above into the cam opening 40a of the pinch press gear 40 rotated in engagement with the gear 36a of the rotating shaft 36. As the insertion pin 37d is moved in the cam opening 40a, the pinch arm 37 is circularly moved, as illustrated in FIG. 27. The pinch arm 37 is circularly moved in a direction that moves the pinch roller 38a toward the capstan shaft 35a, and the pinch roller 38a is pressed against the capstan shaft 35a through the intermediary of the tape-shaped recording medium 102 (refer to FIG. 28 through FIG. 30).

As described above, the tape drive 1 causes the pinch roller 38a to be pressed against the capstan shaft 35a by moving the pinch arm 37 up or down. This arrangement makes it possible to save the installation space, permitting the tape drive 1 to be made smaller.

Meanwhile, the pull-back guide arm 22, the first tape guide arm 23, and the tension regulator lever 24 remain in the same state as in the fast forward feed mode. The tape-shaped recording medium 102 is guided by the pull-back guide roller 22a of the pull-back guide arm 22 and the tape guide roller 23a of the first tape guide arm 23. At the same time, the tension from the spring force of the tensile coil spring 28 is applied to the tape-shaped recording medium 102 through the intermediary of the first guide roller 24a brought into contact with the tape-shaped recording medium 102 (see FIG. 31). At this time, the sensor 29a of the first tension detecting board 29 detects the magnets 26 and 26 disposed on the magnet mounting member 25 so as to detect the position of the tension regulator lever 24 which has been circularly moved. Based on the detection result, the rotational speed of the take-up reel motor 49 is controlled so that a constant tension is always applied to the tape-shaped recording medium 102.

In the forward feed mode, as the capstan shaft 35a rotates at a predetermined speed, the tape-shaped recording medium 102 clamped between the pinch roller 38a and the capstan shaft 35a is pulled out and fed at a predetermined speed.

In the tape drive 1, the reverse feed mode (REV mode) is also set, in which the tape-shaped recording medium 102 is rewound when, for example, a recording error occurs in the tape-shaped recording medium 102. The positional relationship among the constituents in the reverse feed mode is the same as that in the forward feed mode, but the tape-shaped recording medium 102 clamped between the pinch roller 38a and the capstan shaft 35a is fed out in the opposite direction from that in the forward feed mode.

As described above, according to the tape drive 1, in the state wherein the tape-shaped recording medium 102 is wrapped around the drum 17, the tape-shaped recording medium 102 pulled out of the outlet 101a of the tape cassette 100 is always pulled back at a predetermined position by the pull-back guide roller 22a of the pull-back guide arm 22. Thus, the tape path is formed such that the tape-shaped recording medium 102 is shaped like "M", as observed from above.

With this arrangement, a device for forming the tape path only on one side of the drum 17, e.g., only on the right side, is required, so that even when a drum with a larger outside diameter is used to achieve a larger capacity and a higher transfer rate, the space for installing necessary devices can be saved, permitting the tape drive 1 to remain compact.

Furthermore, since the tape-shaped recording medium 102 is always pulled back at the predetermined position by the pull-back guide roller 22a, effective use of the installation space can be achieved. In addition, even if the winding diameter of the tape-shaped recording medium 102 wound around the tape reel 103 changes, the tape-shaped recording medium 102 drawn out of the outlet 101a is always fed along a predetermined path, making it possible to secure stable feed of the tape-shaped recording medium 102.

Moreover, the tape drive 1 is equipped with the tension regulator lever 24, which can be circularly moved and which has the first guide roller 24a and the second guide roller 24b on its both ends, to apply a constant tension to the tape-shaped recording medium 102 by using the single device in the winding feed mode and the non-winding feed mode. This arrangement allows the number of parts to be reduced accordingly and also contributes to effective use of the installation space, thus enabling the tape drive 1 to be made smaller.

The chassis 6 is provided with the first light emitting member 51 located in front of the driving motor 42 and the first light receiving sensor 52 located in the vicinity of the stopper 18a, as set forth above. A tape end is detected by the first light emitting member 51 and the first light receiving sensor 52 shown in FIGS. 32 and 33.

The tape end is detected in both non-winding feed mode (see FIG. 32) in which the tape-shaped recording medium 102 is fed without being wound around the drum 17, and in the winding feed mode (see FIG. 33) in which the tape-shaped recording medium 102 is fed while being wound around the drum 17. The tape end is detected in the same manner in both the non-winding feed mode and the winding feed mode. More specifically, the first light emitting member 51 emits detection light toward the tape-shaped recording medium 102 positioned between the outlet 101a of the tape cassette 100 and the pull-back guide roller 22a of the pull-back guide arm 22, and the detection light is transmitted through the leader tape portion 102b of the tape-shaped recording medium 102 and received by the first light receiving sensor 52 so as to detect the tape end. Upon the detection of the tape end, a detection signal is output to the take-up reel motor 49, and the feed of the tape-shaped recording medium 102 from the tape reel 103 to the take-up reel 31 is stopped.

Thus, using the leader tape portion 102b provided on the tape-shaped recording medium 102 to detect the tape end allows reliable detection of a tape end. Hence, compared with a case where the feed amount of a tape-shaped recording medium is counted and the tape-shaped recording medium is stopped by guessing its tape end, an error attributable to counting can be restrained, and the tape-shaped recording medium 102 can be effectively used to its end. This permits an increase in the available portion of the tape-shaped recording medium 102.

Figure 32:
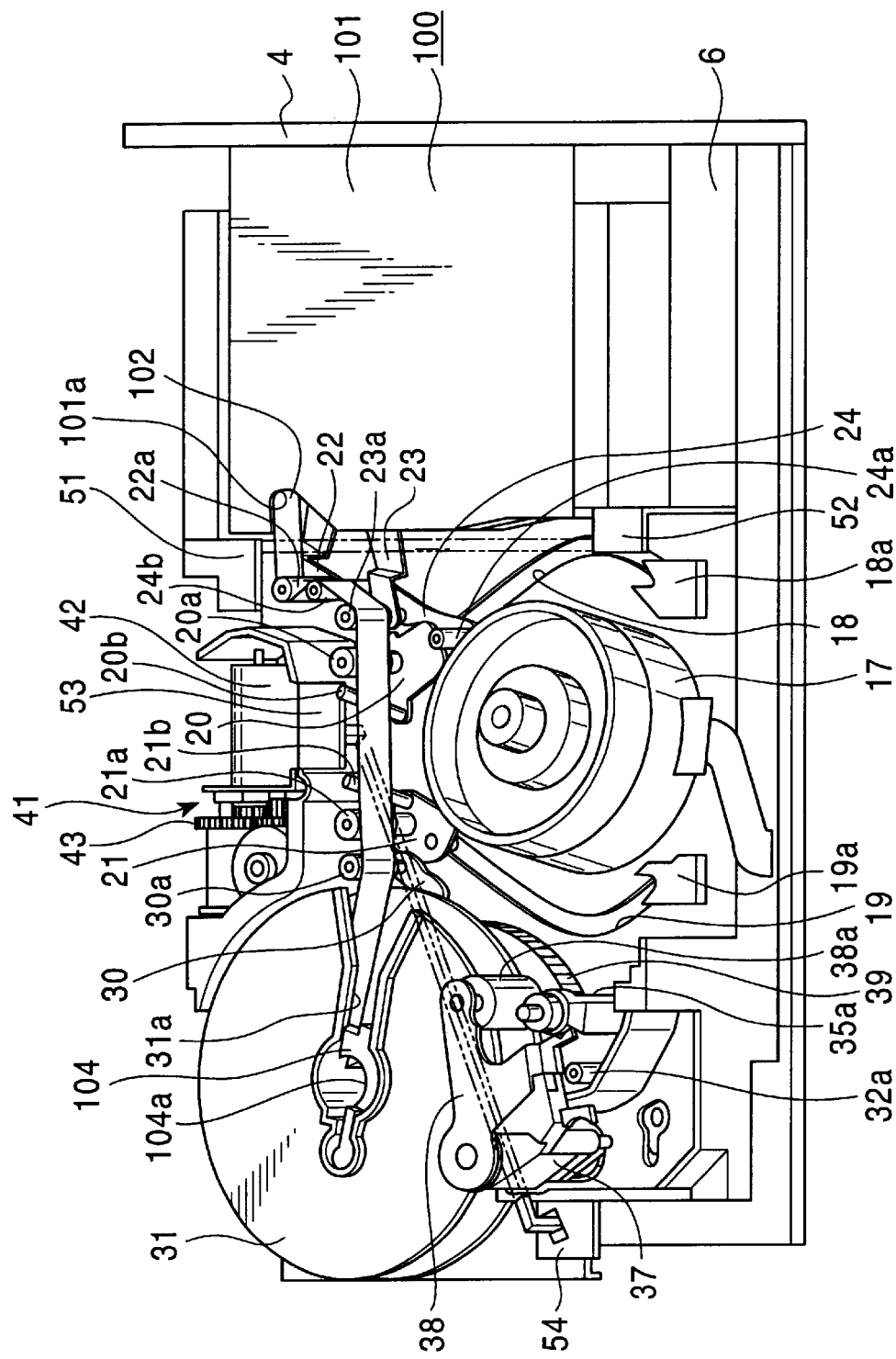
FIG. 32 is a schematic enlarged perspective view illustrating a state wherein a tape top or a tape end is being detected in the non-winding feed mode.
Figure 33:
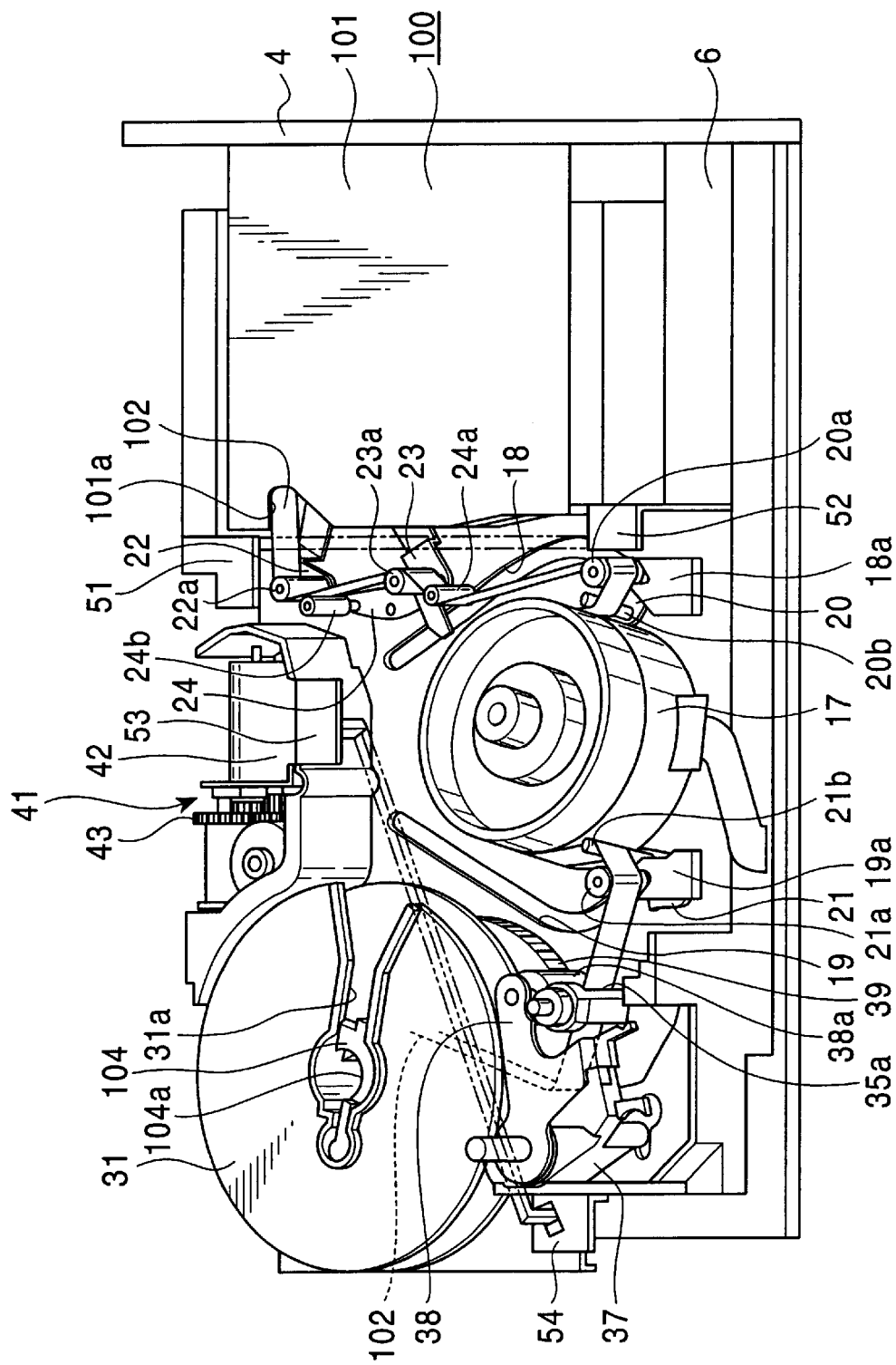
FIG. 33 is a schematic enlarged perspective view illustrating a state wherein a tape top or a tape end is being detected in the winding feed mode.
Figure 34:
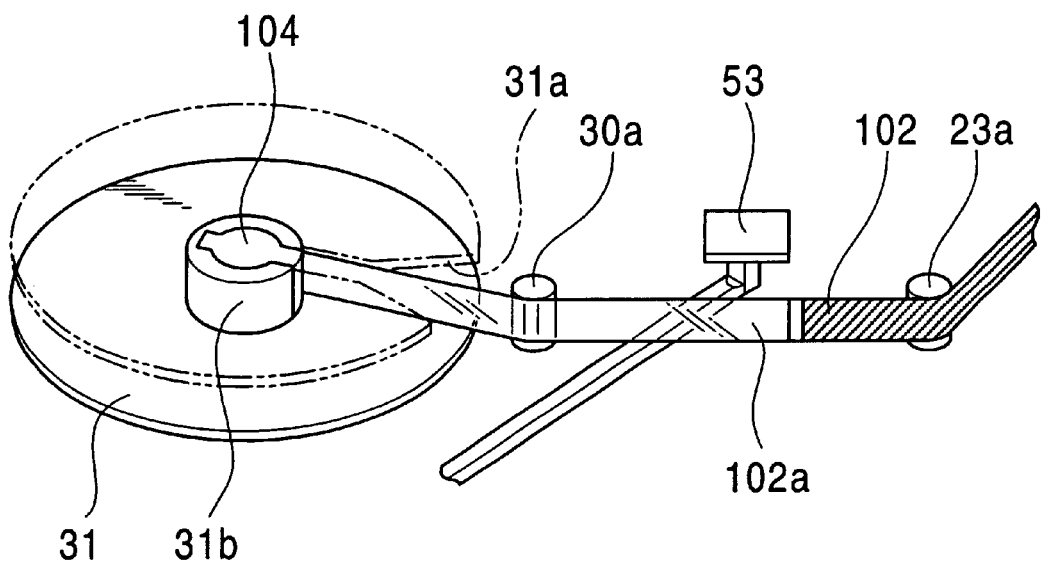
FIG. 34 is a schematic perspective view illustrating a state wherein a tape top has been detected during unloading.
Figure 35:
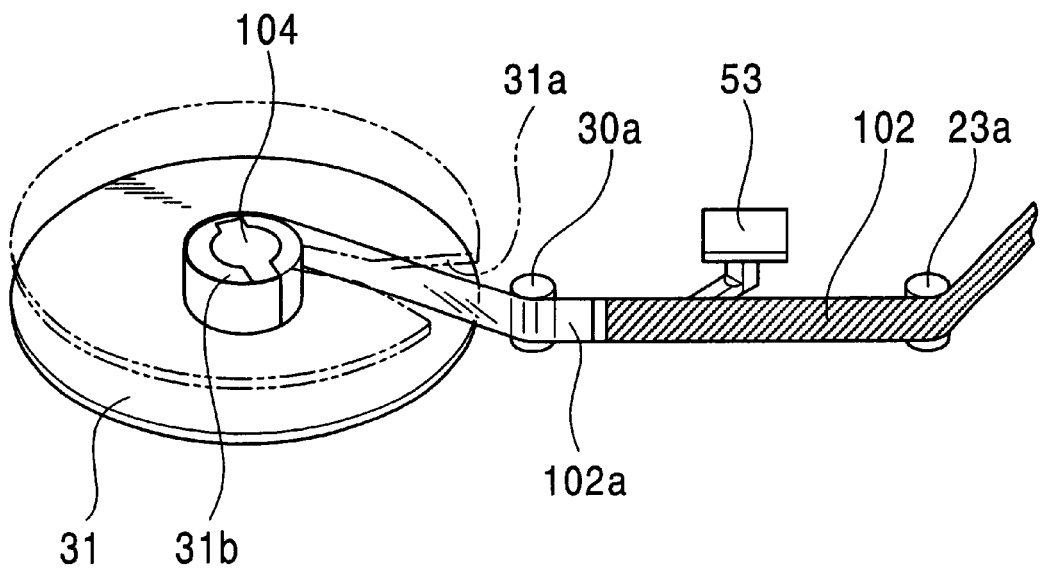
FIG. 35 is a schematic perspective view illustrating a state wherein a tape top has not been detected during unloading.

As described above, the chassis 6 is provided with the second light emitting member 53 positioned right next to the driving motor 42 and the second light receiving sensor 54 positioned at the rear end of the chassis 6 to detect a tape top by the second light emitting member 53 and the second light receiving sensor 54 (refer to FIGS. 32 and 33).

In the non-winding feed mode, the tape top is detected by emitting detection light from the second light emitting member 53 toward the tape-shaped recording medium 102 positioned between the first coaster 20 and the second coaster 21, and the detection light is transmitted through the leader tape portion 102a of the tape-shaped recording medium 102 and received by the second light receiving sensor 54. Thus, the tape top is detected (see FIG. 32). In the winding feed mode, the tape top is detected by emitting detection light from the second light emitting member 53 toward the tape-shaped recording medium 102 positioned in the take-up reel 31, and the detection light is transmitted through the leader tape portion 102a of the tape-shaped recording medium 102 and received by the second light receiving sensor 54. Thus, the tape top is detected (see FIG. 33). As soon as the tape top is detected, a detection signal is output to the tape reel motor 47 so as to stop the feed of the tape-shaped recording medium 102 from the take-up reel 31 to the tape reel 103, and unloading of the tape-shaped recording medium 102 is started in response to a command from a driving circuit (not shown).

As set forth above, in the tape cassette 100 used with the tape drive 1, the length of the leader tape portion 102a is set substantially equal to the outside diameter of the take-up hub 31b of the take-up reel 31. Hence, in the non-winding feed mode, a tape top is detected only when the tape-shaped recording medium 102 has been completely unwound from the take-up hub 31b when the tape-shaped recording medium 102 is unloaded, that is, when the leader block 104 is removed from the center of the take-up reel 31 and accommodated in the case 101 of the tape cassette 100 (see FIG. 34). Conversely, when the leader block 104 is removed from the center of the take-up reel 31, if a distal end of the tape-shaped recording medium 102 remains wrapped around the take-up hub 31b due to a problem, such as the one in which the distal end of the tape-shaped recording medium 102 has been stuck to or caught by the take-up hub 31b, then the tape top will not be detected since the leader tape portion 102a is not at the position that crosses the detection light (see FIG. 35).

Figure 36:
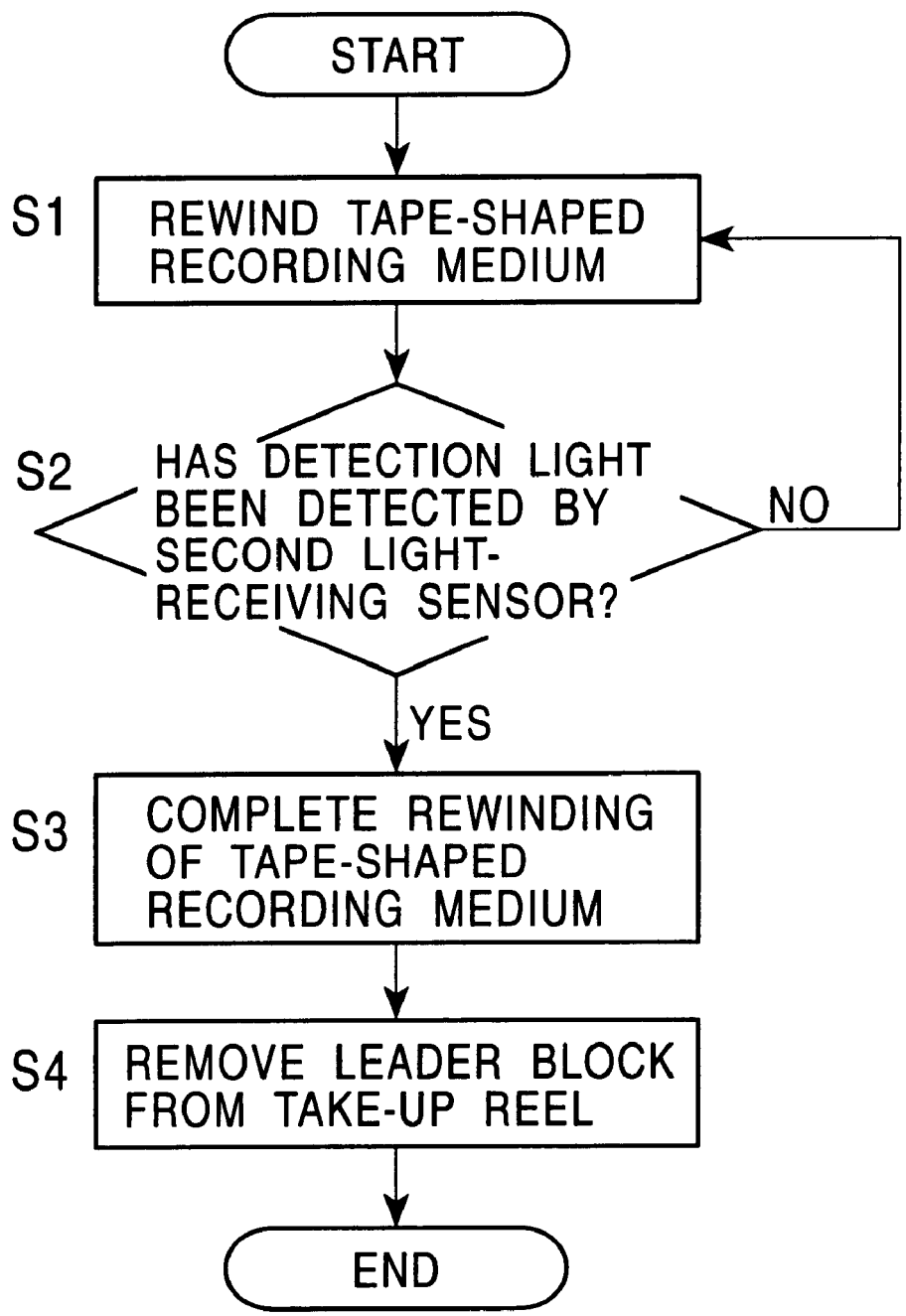
FIG. 36 is a flowchart showing the unloading operation.

FIG. 36 is a flowchart illustrating the operation for unloading the tape-shaped recording medium 102.

In step S1, the unloading operation is started in the non-winding feed mode, and the tape-shaped recording medium 102 is rewound.

In step S2, detection light is emitted from the second light emitting member 53 toward the tape-shaped recording medium 102. When the detection light is transmitted through the leader tape portion 102a and detected by the second light receiving sensor 54, the program proceeds to step S3. If the detection light is not detected by the second light receiving sensor 54, then the program returns to step S1.

In step S3, the rewinding of the tape-shaped recording medium 102 is completed upon the detection of the detection light.

In step S4, the leader block 104 is removed from the take-up reel 31 and accommodated in the case 101, thus completing the unloading operation.

As described above, according to the tape drive 1, the tape top is not detected unless the tape-shaped recording medium 102 has been completely unwound from the take-up hub 31b. This prevents the leader block 104 from being forcibly disengaged from the take-up reel 31 when the distal end of the tape-shaped recording medium 102 is still on the take-up hub 31b; hence, the tape-shaped recording medium 102 can be protected from damage when the leader block 104 is removed.

In the embodiment described above, the tape-shaped recording medium 102 having the leader tape portion 102a provided with the light-transmitting distal end has been used. Alternatively, however, a tape-shaped recording medium may be used, that has, for example, a light-transmitting aperture in a portion thereof extending from the distal end such that its length is substantially equal to the outside diameter of the take-up hub 31b of the take-up reel 31. When the tape-shaped recording medium having the light-transmitting aperture is used, the tape top is detected only when the tape-shaped recording medium has been completely unwound from the take-up hub 31b when the tape-shaped recording medium is unloaded, thus providing the same advantage in that the leader block 104 is not forcibly detached from the take-up reel 31 while the distal end of the tape-shaped recording medium is still on the take-up hub 31b. This makes it possible to prevent damage to the tape-shaped recording medium when the leader block 104 is removed.

All the specific shapes and constructions of the constituents shown in the embodiment described above are merely examples in embodying the present invention, and are not meant to be construed to limit the technological scope of the present invention.

What is claimed is:

1. A tape drive for a single reel type tape cassette, in which a tape shaped recording medium is wound around a single cassette reel rotatably supported in a case operating with a loading mechanism that draws out the tape shaped recording medium from an outlet of the case and feeds the drawn out tape-shaped recording medium, the tape drive comprising:
- a drum around which the tape shaped recording medium drawn out of the case is wound in slidable contact;
- a pull back guide shaft for pulling back the tape shaped recording medium that has been drawn out by the loading mechanism to a predetermined position in a vicinity of the outlet of the case; and
- a pair of guide pins arranged for movement toward or away from the drum and positioned so that the pair of guide pins are facing away from each other in a circumferential direction of the drum when the pair of guide pins are moved toward the drum,
- wherein the tape shaped recording medium, which has been drawn out of the case by the loading mechanism, is pulled back in sequence by the pull back guide shaft and the pair of guide pins moved toward the drum so that the tape shaped recording medium positioned between the pair of guide pins is wound around the drum.

2. A tape drive for a tape cassette, in which a tape shaped recording medium is wound around a single cassette reel rotatably supported in a case operating with a loading mechanism that draws out the tape shaped recording medium from an outlet of the case and feeds the drawn out of tape-shaped recording medium, the tape drive comprising:
- a drum around which the tape shaped recording medium drawn out of the case is wound in slidable contact; and
- a tension mechanism for applying a predetermined tension to the tape shaped recording medium under a condition wherein the tape shaped recording medium has been drawn out and a tape path has been formed,
- wherein the tape drive has a fast feed mode in which the tape shaped recording medium is fed at high speed under a predetermined tension applied by the tension mechanism in a state in which the tape shaped recording medium is not wound around the drum.

3. A tape drive for a tape cassette, in which a tape shaped recording medium is wound around a single cassette reel rotatably supported in a case operating with a loading mechanism that draws out the tape shaped recording medium from an outlet of the case and feeds the drawn out tape-shaped recording medium, and having a winding feed mode in which the tape shaped recording medium is fed while being wound around a drum and a non winding feed mode in which the tape shaped recording medium is fed while being not wound around the drum, the tape drive comprising:
- a tension regulator lever that is rotatably supported by a chassis and circularly moved in a first direction in the winding feed mode, and moved in a second direction, which is opposite from the first direction, in the non winding feed mode;
- a first guide shaft provided on the tension regulator lever to apply a tension by coming in contact with the tape shaped recording medium when the tension regulator lever is circularly moved in the first direction in the winding feed mode; and
- a second guide shaft provided on the tension regulator lever to apply a tension by coming in contact with the tape shaped recording medium when the tension regulator lever is circularly moved in the second direction in the non winding feed mode.

4. A tape drive in which a tape shaped recording medium is wound around a drum, a predetermined tape path is formed, and the tape shaped recording medium is fed forward at high speed from one reel toward an other reel in a fast forward feed mode, or the tape shaped recording medium is fed backward at high speed from the other reel toward the one reel in a fast reverse feed mode, the tape drive comprising:
- a first tension mechanism provided between the drum and the one reel to apply a predetermined tension to the tape shaped recording medium in the fast forward feed mode in which a tape path is formed and the tape shaped recording medium is fed forward at high speed; and
- a second tension mechanism provided between the drum and the other reel to apply a predetermined tension to the tape shaped recording medium in the fast reverse feed mode in which a tape path is formed and the tape shaped recording medium is fed backward at high speed.

5. A tape drive having a single reel type tape cassette, in which a tape shaped recording medium is wound around a single cassette reel rotatably supported in a case operating with a loading mechanism that draws out the tape shaped recording medium from an outlet of the case and feeds the drawn out tape-shaped recording medium, the tape drive comprising:
- a drum around which the tape shaped recording medium drawn out of the case is wound in slidable contact;
- a pull back guide shaft for pulling back the tape shaped recording medium, which has been drawn out by the loading mechanism, at a predetermined position in the vicinity of the outlet of the case;
- a pair of guide pins arranged for movement toward or away from the drum and positioned so that the pair of guide pins are facing away from each other in a circumferential direction of the drum when the pair of guide pins are moved toward the drum; and
- a tension mechanism for applying a predetermined tension to the tape shaped recording medium under a condition wherein the tape shaped recording medium has been drawn out and a tape path has been formed,
- wherein the tape shaped recording medium that has been drawn out of the case by the loading mechanism is pulled back in sequence by the pull back guide shaft and the pair of guide pins moved toward the drum, and
- a non winding fast feed mode is set wherein the tape shaped recording medium is fed at high speed while being subjected to a predetermined tension applied by the tension mechanism in a state wherein the tape shaped recording medium is not wound around the drum.

6. The tape drive according to claim 5, wherein the tension mechanism of the tape drive comprises:
- a tension regulator lever that is rotatably supported by a chassis and circularly moved in a first direction in a winding feed mode, and moved in a second direction, which is opposite from the first direction, in a non winding feed mode;
- a first guide shaft provided on the tension regulator lever to apply a tension by coming in contact with the tape shaped recording medium when the tension regulator lever is circularly moved in the first direction in the winding feed mode; and
- a second guide shaft provided on the tension regulator lever to apply a tension by coming in contact with the tape shaped recording medium when the tension regulator lever is circularly moved in the second direction in the non winding feed mode.

7. The tape drive according to claim 6, wherein the tension mechanism comprises:
   a first tension mechanism for applying a predetermined tension to the tape shaped recording medium in a fast forward feed mode in which the tape shaped recording medium is wound around the drum, a predetermined tape path is formed, and the tape shaped recording medium is fed forward at high speed; and
   a second tension mechanism provided between the drum and the other reel to apply a predetermined tension to the tape shaped recording medium in a fast reverse feed mode in which a tape path is formed and the tape shaped recording medium is fed backward at high speed.

* * * * *